US012262036B1

(12) United States Patent
Galvin

(10) Patent No.: US 12,262,036 B1
(45) Date of Patent: *Mar. 25, 2025

(54) SYSTEM AND METHODS FOR IMAGE SERIES TRANSFORMATION FOR OPTIMAL COMPRESSIBILITY WITH NEURAL UPSAMPLING

(71) Applicant: AtomBeam Technologies Inc., Moraga, CA (US)

(72) Inventor: Brian Galvin, Silverdale, WA (US)

(73) Assignee: ATOMBEAM TECHNOLOGIES INC, Moraga, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/915,030

(22) Filed: Oct. 14, 2024

Related U.S. Application Data

(63) Continuation-in-part of application No. 18/668,163, filed on May 18, 2024, now Pat. No. 12,167,031, (Continued)

(51) Int. Cl.
*H04N 19/42* (2014.01)
*H04N 19/119* (2014.01)
(Continued)

(52) U.S. Cl.
CPC .......... *H04N 19/42* (2014.11); *H04N 19/119* (2014.11); *H04N 19/132* (2014.11);
(Continued)

(58) Field of Classification Search
CPC .... H04N 19/42; H04N 19/119; H04N 19/132; H04N 19/136; H04N 19/174;
(Continued)

(56) References Cited

U.S. PATENT DOCUMENTS 7,629,922 B2   12/2009   Winstead et al.
7,876,257 B2   1/2011    Vetro et al.
(Continued)

FOREIGN PATENT DOCUMENTS

CN   106210742 A1 * 12/2016   ............ H04N 19/85
CN   111182301 A     5/2020
(Continued)

OTHER PUBLICATIONS

Lowe, David G., Distinctive Image Features from Scale-Invariant Keypoints, Jan. 5, 2004, pp. 1-28, Vancouver, B. C., Canada.

*Primary Examiner* — Jose L Couso
(74) *Attorney, Agent, or Firm* — Galvin Patent Law LLC; Brian R. Galvin

(57) ABSTRACT

Image series transformation for optimal compressibility is performed with neural upsampling and error resilience. It incorporates a novel correlation network composed of convolutional layers for feature extraction and a channel-wise transformer with attention to capture complex inter-channel dependencies. The system includes an angle optimizer to further enhance the compressibility of an image and an error resilience subsystem to improve robustness against transmission errors and data loss. The convolutional layers extract multi-dimensional features from the image, while the channel-wise transformer learns global inter-channel relationships. The error resilience subsystem applies forward error correction coding, data partitioning based on importance, and embeds error concealment hints. This hybrid approach addresses both local and global features, mitigates compression artifacts, improves image quality, and enhances data integrity during transmission. The correlation network incorporates error correction and concealment techniques during decoding. The model's outputs enable effective
(Continued)

image reconstruction, achieving advanced compression while preserving information for accurate analysis.

16 Claims, 23 Drawing Sheets

Related U.S. Application Data which is a continuation-in-part of application No. 18/537,728, filed on Dec. 12, 2023, now Pat. No. 12,058,333.

(51) Int. Cl.
  *H04N 19/132* (2014.01)
  *H04N 19/136* (2014.01)
  *H04N 19/174* (2014.01)
  *H04N 19/60* (2014.01)
  *H04N 19/66* (2014.01)

(52) U.S. Cl.
  CPC ......... *H04N 19/136* (2014.11); *H04N 19/174* (2014.11); *H04N 19/60* (2014.11); *H04N 19/66* (2014.11)

(58) Field of Classification Search
  CPC ........ H04N 19/60; H04N 19/66; H04N 19/59; H04N 19/172; H04N 19/124; H04N 19/80; H04N 19/14; H04N 19/85; H04N 19/395; H04N 19/503; H04N 19/61; G06T 5/50; G06T 2207/10044; G06T 2207/10032; G06T 2207/30181; G06T 9/00; G06T 9/004; G06T 9/007; G06T 3/4046; G06T 5/60; G06T 9/002; G06T 2207/20076; G06T 2207/20081; G06T 2207/20084; G06V 10/82; G06V 20/13; G06V 20/10; G06V 10/467; G06V 10/454; G06V 10/54; G06V 10/774; G06V 30/18057; G01S 13/90; G01S 13/9004; G01S 13/904; G01S 13/9017; G01S 13/9076; G01S 17/90; G01S 7/417; G01S 7/2886; H03M 7/30; H03M 7/40; H03M 7/3062; H03M 7/3082; H03M 7/4006; G10L 19/008; G10L 25/30; G06N 3/02; G06N 3/08–088; G06N 3/0445; G06N 3/0454; G06N 3/4046; G06N 7/00; G06N 7/01; G06N 20/00; G06K 7/1482; Y10S 128/925
  See application file for complete search history.

(56) References Cited

U.S. PATENT DOCUMENTS

| | | | |
|---|---|---|---|
| 11,656,353 B2 | 5/2023 | Li et al. | |
| 12,058,333 B1* | 8/2024 | Li | G01S 13/9021 |
| 12,167,031 B1* | 12/2024 | Galvin | H04N 19/59 |
| 2013/0077843 A1* | 3/2013 | Bruder | A61B 6/4441 |
| | | | 382/131 |
| 2023/0090743 A1 | 3/2023 | Pinto et al. | |
| 2023/0154055 A1 | 5/2023 | Besenbruch et al. | |
| 2023/0236271 A1 | 7/2023 | Fessler et al. | |
| 2023/0239500 A1 | 7/2023 | Yang et al. | |
| 2023/0368438 A1* | 11/2023 | Shen | G06T 11/006 |

FOREIGN PATENT DOCUMENTS

| | | |
|---|---|---|
| CN | 111869206 A | 10/2020 |
| CN | 115706798 A | 2/2023 |
| WO | 2023017975 A1 | 2/2023 |

\* cited by examiner

SYSTEM AND METHODS FOR IMAGE SERIES TRANSFORMATION FOR OPTIMAL COMPRESSIBILITY WITH NEURAL UPSAMPLING

CROSS-REFERENCE TO RELATED APPLICATIONS

Priority is claimed in the application data sheet to the following patents or patent applications, each of which is expressly incorporated herein by reference in its entirety:
Ser. No. 18/668,163
Ser. No. 18/537,728

BACKGROUND OF THE INVENTION

Field of the Art

The present invention is in the field of data compression, and more particularly is directed to the problem of recovering data lost from lossy compression and decompression.

Discussion of the State of the Art

For many applications, such as video compression for streaming video, lossy compression techniques such as HEVC (high-efficiency video coding) to optimize the use of available bandwidth and for other purposes. By definition, lossy compression involves the loss of some of the data being transmitted in the process of compression; in the video compression example, this results in lower-resolution video and provides the reason for pixelated video in low-bandwidth situations. Clearly it would be desirable to recover as much of the lost data as possible, but of course this is impossible in a single compressed channel for the method of compression results in a true loss of information.

As a concrete example, synthetic aperture radar (SAR) is a technology used in remote sensing to create high-resolution images of the Earth's surface by transmitting microwave signals via satellite and measuring their reflections. SAR images provide valuable information for various applications, including environmental monitoring, disaster management, agriculture, and defense. SAR data is often combined with other geospatial data sources, such as optical imagery, Geographic Information Systems (GIS) data, and topographic maps, to create comprehensive and accurate assessments of various situations and phenomena. The capabilities of SAR technology continue to expand, and ongoing research is likely to uncover new applications and uses for SAR image data.

Complex-valued SAR imaging generates images in the slant range by azimuth imaging plane, corresponding to the satellite's data acquisition in the image plane. Each pixel in the SAR image is represented by a complex value consisting of both In-phase (I) and Quadrature (Q) components. In practice, SAR image stores this I and Q value as the single channel complex variable I+Qi (H×W×1) or two separate channels for I and Q (H×W×2). The amplitude and phase can be reconstructed from the I and Q channel as:

$$\text{Amplitude} = \sqrt{I^2 + Q^2}$$

$$\text{Phase} = \arctan\left(\frac{Q}{I}\right)$$

Complex-value SAR image compression refers to the process of compressing SAR images that have complex-valued pixel data. The preservation of SAR image quality using lossless compression methods is inefficient due to the large storage requirements and limited transmission efficiency. Therefore, the development of a lossy compression algorithm reduces the bit rate while maintaining acceptable image quality poses a significant challenge. The challenge of SAR images arises from two main factors: a large dynamic range and the presence of noise which arises due to the coherent nature of SAR imaging and the interference of radar waves reflected from different scatterers within the resolution cell. The amplitude component represents intensity of the backscattered radar signal, which is crucial for image interpretation. However, its sensitivity to noise presents difficulties in accurately compressing the phase while preserving essential details. While conventional optical compression algorithms can handle amplitude images with relative ease, they struggle when applied to phase images due to their minimal information content and sensitivity to slight changes in imaging parameters.

Existing conventional optical compression methods like JPEG, JPEG2000, and HEVC have been successfully used for compressing SAR amplitude images. Nonetheless, these methods encounter limitations when dealing with SAR images that consist of both amplitude and phase information. Recent advancements in learning-based SAR compression methods have introduced deep neural networks that effectively compress SAR amplitude images. However, these methods still encounter challenges in compressing the phase image due to its noise sensitivity and minimal redundancy. This issue substantially raises the bits-per-pixel requirement for the phase image, rendering its compression nearly impractical.

While these existing systems offer various solutions to complex SAR image compression, they are inadequate in that they are prone to loss of information which can introduce compression artifacts that can adversely affect the interpretability of the compressed SAR images. Also, they are limited in real-time processing (such as is required during disaster response and surveillance) as existing systems might not be able to compress and decompress complex-value data quickly enough for these time-sensitive applications.

What is needed is a system and methods for upsampling of decompressed data after lossy compression using a neural network.

SUMMARY OF THE INVENTION

Accordingly, the inventor has conceived and reduced to practice, a system and method for image series transformation for optimal compressibility with neural upsampling and error resilience. It incorporates optimal reslicing, advanced compression techniques, error resilience methods, and deep learning-based reconstruction to enable highly efficient, accurate, and robust compression of image series data. By adaptively reslicing the data based on its inherent structure and correlations, applying error resilience techniques, and leveraging a deep neural network to learn the relationships between the original and compressed data, the proposed system can achieve higher compression ratios than traditional approaches while preserving more of the relevant information and ensuring resilience against transmission errors or data loss. Moreover, the invention can recover fine details and minimize artifacts, even at high compression levels.

According to a preferred embodiment, a system for image series transformation for optimal compressibility with neural upsampling and error resilience, comprising: a computing device comprising at least a memory and a processor; a plurality of programming instructions that, when operating on the processor, cause the computing device to: collect a plurality of images; train an angle optimizer using the plurality of images on how to optimally slice the plurality of images to maximize each image's compressibility; slice the images along an optimal angle, as determined by the angle optimizer; and reconstruct the sliced images into a plurality of reconstructed images; encode the plurality of reconstructed images into a plurality of compressed images; apply error resilience techniques to the compressed images; decode the plurality of compressed images into a plurality of decompressed images; and upsample the plurality of decompressed images using a multi-channel transformer, where the output includes more information than the plurality of reconstructed images, is disclosed.

According to another preferred embodiment, a method for image series transformation for optimal compressibility with neural upsampling and error resilience, comprising the steps of: collecting a plurality of images; training an angle optimizer using the plurality of images on how to optimally slice the plurality of images to maximize each image's compressibility; slicing the images along an optimal angle, as determined by the angle optimizer; reconstructing the sliced images into a plurality of reconstructed images; encoding the plurality of reconstructed images into a plurality of compressed images; applying error resilience techniques to the compressed images; decoding the plurality of compressed images into a plurality of decompressed images; and upsampling the plurality of decompressed images using a multi-channel transformer, where the output includes more information than the plurality of reconstructed images, is disclosed.

According to an aspect of an embodiment, the angle optimizer is a convolutional neural network.

According to an aspect of an embodiment, the plurality of images includes medical images such as CAT scans, and aerial images which may be processed into 3D representations.

According to an aspect of an embodiment, applying error resilience techniques comprises: forward error correction coding, data partitioning based on importance, and embedding error concealment hints.

According to an aspect of an embodiment, decoding the plurality of compressed images includes performing error correction and concealment based on the applied error resilience techniques.

According to an aspect of an embodiment, the forward error correction coding uses Reed-Solomon codes or Low-Density Parity-Check codes.

According to an aspect of an embodiment, the data partitioning separates the compressed images into at least three partitions: header information, low-frequency coefficients, and high-frequency coefficients.

According to an aspect of an embodiment, the error concealment hints include information about neighboring blocks or redundant feature data.

BRIEF DESCRIPTION OF THE DRAWING FIGURES

DETAILED DESCRIPTION OF THE INVENTION

Figure 1:
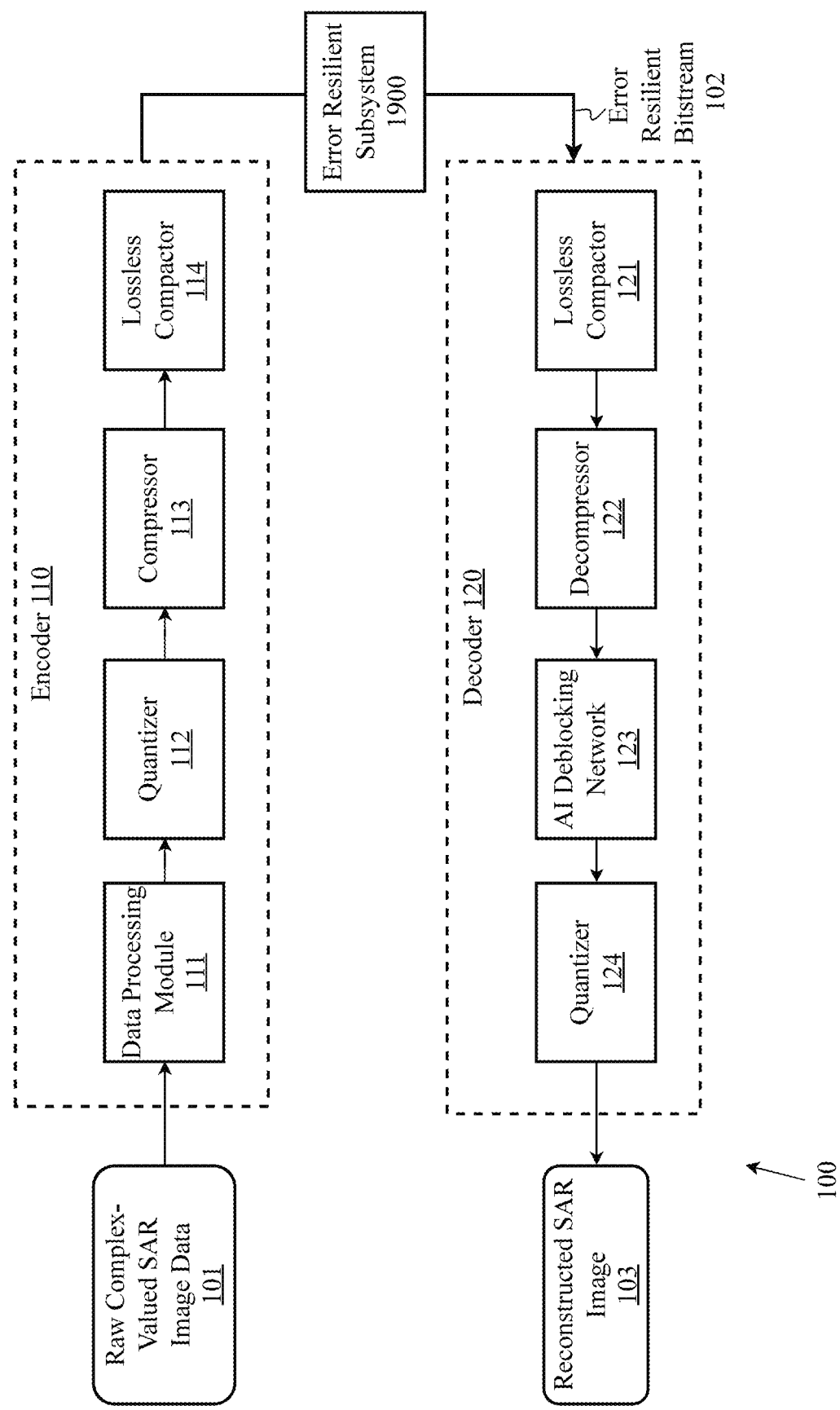
FIG. 1 is a block diagram illustrating an exemplary system architecture for complex-valued SAR image compression with predictive recovery, according to an embodiment.

The inventor has conceived, and reduced to practice, a system and methods for image series transformation for optimal compressibility with neural upsampling and error resilience. It incorporates the use of adaptive reslicing techniques guided by machine learning algorithms to determine the optimal orientation for compressing the data, exploiting the inherent redundancies and correlations present in the image stack. The resliced data is then compressed using state-of-the-art codecs, enhanced with error resilience techniques, decompressed, and enhanced using deep learning models that can recover fine details and structures lost during compression. The invention enables significant reductions in storage and transmission costs while maintaining high fidelity to the original data and ensuring robustness against transmission errors, making it valuable for a wide range of applications in healthcare, remote sensing, and beyond.

Synthetic Aperture Radar technology is used to capture detailed images of the Earth's surface by emitting microwave signals and measuring their reflections. Unlike traditional grayscale images that use a single intensity value per pixel, SAR images are more complex. Each pixel in a SAR image contains not just one value but a complex number (I+Qi). A complex number consists of two components: magnitude (or amplitude) and phase. In the context of SAR, the complex value at each pixel represents the strength of the radar signal's reflection (magnitude) and the phase shift (phase) of the signal after interacting with the terrain. This information is crucial for understanding the properties of the surface and the objects present. In a complex-value SAR image, the magnitude of the complex number indicates the intensity of the radar reflection, essentially representing how strong the radar signal bounced back from the surface. Higher magnitudes usually correspond to stronger reflections, which may indicate dense or reflective materials on the ground.

The complex nature of SAR images stems from the interference and coherence properties of radar waves. When radar waves bounce off various features on the Earth's surface, they can interfere with each other. This interference pattern depends on the radar's wavelength, the angle of incidence, and the distances the waves travel. As a result, the radar waves can combine constructively (amplifying the signal) or destructively (canceling out the signal). This interference phenomenon contributes to the complex nature of SAR images. The phase of the complex value encodes information about the distance the radar signal traveled and any changes it underwent during the round-trip journey. For instance, if the radar signal encounters a surface that's slightly elevated or depressed, the phase of the returning signal will be shifted accordingly. Phase information is crucial for generating accurate topographic maps and understanding the geometry of the terrain.

Coherence refers to the consistency of the phase relationship between different pixels in a SAR image. Regions with high coherence have similar phase patterns and are likely to represent stable surfaces or structures, while regions with low coherence might indicate changes or disturbances in the terrain.

Complex-value SAR image compression is important for several reasons such as data volume reduction, bandwidth and transmission efficiency, real-time applications, and archiving and retrieval. SAR images can be quite large due to their high resolution and complex nature. Compression helps reduce the storage and transmission requirements, making it more feasible to handle and process the data. When SAR images need to be transmitted over limited bandwidth channels, compression can help optimize data transmission and minimize communication costs. Some SAR applications, such as disaster response and surveillance, require real-time processing. Compressed data can be processed faster, enabling quicker decision-making. Additionally, compressed SAR images take up less storage space, making long-term archiving and retrieval more manageable. However, the compression process can introduce vulnerabilities to transmission errors, which is addressed by the error resilience techniques introduced in this invention.

According to various embodiments, a system is proposed which provides a novel pipeline for compressing and subsequently recovering complex-valued SAR image data using a prediction recovery framework that utilizes a conventional image compression algorithm to encode the original image to a bitstream. In an embodiment, a lossless compaction method may be applied to the encoded bitstream, further reducing the size of the SAR image data for both storage and transmission. The system then applies error resilience techniques to the compressed images, enhancing their robustness against transmission errors or data loss. Subsequently, the system decodes a prediction of the I/Q channels, performs error correction and concealment based on the applied error resilience techniques, and then recovers the phase and amplitude via a deep-learning based network to effectively remove compression artifacts and recover information of the SAR image as part of the loss function in the training. The deep-learning based network may be referred to herein as an artificial intelligence (AI) deblocking network.

Deblocking refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames.

According to various embodiments, the disclosed system and methods may utilize a SAR recovery network configured to perform data deblocking during the data decoding process. Amplitude and phase images exhibit a non-linear relationship, while I and Q images demonstrate a linear relationship. The SAR recovery network is designed to leverage this linear relationship by utilizing the I/Q images to enhance the decoded SAR image. In an embodiment, the SAR recovery network is a deep learned neural network. According to an aspect of an embodiment, the SAR recovery network utilizes residual learning techniques. According to an aspect of an embodiment, the SAR recovery network comprises a channel-wise transformer with attention. According to an aspect of an embodiment, the SAR recovery network comprises Multi-Scale Attention Blocks (MSAB). The network is also designed to work in conjunction with the applied error resilience techniques, leveraging the additional information provided by these techniques to improve the quality of the reconstructed images.

A channel-wise transformer with attention is a neural network architecture that combines elements of both the transformer architecture and channel-wise attention mechanisms. It's designed to process multi-channel data, such as SAR images, where each channel corresponds to a specific feature map or modality. The transformer architecture is a powerful neural network architecture initially designed for natural language processing (NLP) tasks. It consists of self-attention mechanisms that allow each element in a sequence to capture relationships with other elements, regardless of their position. The transformer has two main components: the self-attention mechanism (multi-head self-attention) and feedforward neural networks (position-wise feedforward layers). Channel-wise attention, also known as "Squeeze-and-Excitation" (SE) attention, is a mechanism commonly used in convolutional neural networks (CNNs) to model the interdependencies between channels (feature maps) within a single layer. It assigns different weights to different channels to emphasize important channels and suppress less informative ones. At each layer of the network, a channel-wise attention mechanism is applied to the input data. This mechanism captures the relationships between different channels within the same layer and assigns importance scores to each channel based on its contribution to the overall representation. After the channel-wise attention, a transformer-style self-attention mechanism is applied to the output of the channel-wise attention. This allows each channel to capture dependencies with other channels in a more global context, similar to how the transformer captures relationships between elements in a sequence. Following the transformer self-attention, feedforward neural network layers (position-wise feedforward layers) can be applied to further process the transformed data.

One or more different aspects may be described in the present application. Further, for one or more of the aspects described herein, numerous alternative arrangements may be described; it should be appreciated that these are presented for illustrative purposes only and are not limiting of the aspects contained herein or the claims presented herein in any way. One or more of the arrangements may be widely applicable to numerous aspects, as may be readily apparent from the disclosure. In general, arrangements are described in sufficient detail to enable those skilled in the art to practice one or more of the aspects, and it should be appreciated that other arrangements may be utilized and that structural, logical, software, electrical and other changes may be made without departing from the scope of the particular aspects. Particular features of one or more of the aspects described herein may be described with reference to one or more particular aspects or figures that form a part of the present disclosure, and in which are shown, by way of illustration, specific arrangements of one or more of the aspects. It should be appreciated, however, that such features are not limited to usage in the one or more particular aspects or figures with reference to which they are described. The present disclosure is neither a literal description of all arrangements of one or more of the aspects nor a listing of features of one or more of the aspects that must be present in all arrangements.

Headings of sections provided in this patent application and the title of this patent application are for convenience only, and are not to be taken as limiting the disclosure in any way.

Devices that are in communication with each other need not be in continuous communication with each other, unless expressly specified otherwise. In addition, devices that are in communication with each other may communicate directly or indirectly through one or more communication means or intermediaries, logical or physical.

A description of an aspect with several components in communication with each other does not imply that all such components are required. To the contrary, a variety of optional components may be described to illustrate a wide variety of possible aspects and in order to more fully illustrate one or more aspects. Similarly, although process steps, method steps, algorithms or the like may be described in a sequential order, such processes, methods and algorithms may generally be configured to work in alternate orders, unless specifically stated to the contrary. In other words, any sequence or order of steps that may be described in this patent application does not, in and of itself, indicate a requirement that the steps be performed in that order. The steps of described processes may be performed in any order practical. Further, some steps may be performed simultaneously despite being described or implied as occurring non-simultaneously (e.g., because one step is described after the other step). Moreover, the illustration of a process by its depiction in a drawing does not imply that the illustrated process is exclusive of other variations and modifications thereto, does not imply that the illustrated process or any of its steps are necessary to one or more of the aspects, and does not imply that the illustrated process is preferred. Also, steps are generally described once per aspect, but this does not mean they must occur once, or that they may only occur once each time a process, method, or algorithm is carried out or executed. Some steps may be omitted in some aspects or some occurrences, or some steps may be executed more than once in a given aspect or occurrence.

When a single device or article is described herein, it will be readily apparent that more than one device or article may be used in place of a single device or article. Similarly, where more than one device or article is described herein, it will be readily apparent that a single device or article may be used in place of the more than one device or article.

The functionality or the features of a device may be alternatively embodied by one or more other devices that are not explicitly described as having such functionality or features. Thus, other aspects need not include the device itself.

Techniques and mechanisms described or referenced herein will sometimes be described in singular form for clarity. However, it should be appreciated that particular aspects may include multiple iterations of a technique or multiple instantiations of a mechanism unless noted otherwise. Process descriptions or blocks in figures should be understood as representing modules, segments, or portions of code which include one or more executable instructions for implementing specific logical functions or steps in the process. Alternate implementations are included within the scope of various aspects in which, for example, functions may be executed out of order from that shown or discussed, including substantially concurrently or in reverse order, depending on the functionality involved, as would be understood by those having ordinary skill in the art.

The error resilience techniques applied to the compressed images may include forward error correction coding, data partitioning based on importance, and embedding error concealment hints. Forward error correction coding, such as Reed-Solomon codes or Low-Density Parity-Check codes, adds redundant data to the compressed images, allowing for the correction of a certain number of errors without retransmission. Data partitioning separates the compressed images into at least three partitions: header information, low-frequency coefficients, and high-frequency coefficients. This partitioning allows for prioritized transmission and protection of the most critical image data. Error concealment hints, which may include information about neighboring blocks or redundant feature data, are embedded within the compressed data to assist in concealing errors during the decoding process.

During the decoding process, the system performs error correction and concealment based on the applied error resilience techniques. This process involves detecting and correcting errors using the forward error correction codes, prioritizing the reconstruction of the most important partitions of the image data, and utilizing the embedded error concealment hints to mitigate the impact of any uncorrectable errors. These techniques work in concert with the AI deblocking network to produce high-quality reconstructed images that are resilient to transmission errors and data loss.

Definitions

The term "bit" refers to the smallest unit of information that can be stored or transmitted. It is in the form of a binary digit (either 0 or 1). In terms of hardware, the bit is represented as an electrical signal that is either off (representing 0) or on (representing 1).

The term "codebook" refers to a database containing sourceblocks each with a pattern of bits and reference code unique within that library. The terms "library" and "encoding/decoding library" are synonymous with the term codebook.

The terms "compression" and "deflation" as used herein mean the representation of data in a more compact form than the original dataset. Compression and/or deflation may be either "lossless", in which the data can be reconstructed in its original form without any loss of the original data, or "lossy" in which the data can be reconstructed in its original form, but with some loss of the original data.

The terms "compression factor" and "deflation factor" as used herein mean the net reduction in size of the compressed data relative to the original data (e.g., if the new data is 70% of the size of the original, then the deflation/compression factor is 30% or 0.3.)

The terms "compression ratio" and "deflation ratio", and as used herein all mean the size of the original data relative to the size of the compressed data (e.g., if the new data is 70% of the size of the original, then the deflation/compression ratio is 70% or 0.7.)

The term "data set" refers to a grouping of data for a particular purpose. One example of a data set might be a word processing file containing text and formatting information. Another example of a data set might comprise data gathered/generated as the result of one or more radars in operation.

The term "sourcepacket" as used herein means a packet of data received for encoding or decoding. A sourcepacket may be a portion of a data set.

The term "sourceblock" as used herein means a defined number of bits or bytes used as the block size for encoding or decoding. A sourcepacket may be divisible into a number of sourceblocks. As one non-limiting example, a 1 megabyte sourcepacket of data may be encoded using 512 byte sourceblocks. The number of bits in a sourceblock may be dynamically optimized by the system during operation. In one aspect, a sourceblock may be of the same length as the block size used by a particular file system, typically 512 bytes or 4,096 bytes.

The term "codeword" refers to the reference code form in which data is stored or transmitted in an aspect of the system. A codeword consists of a reference code to a sourceblock in the library plus an indication of that sourceblock's location in a particular data set.

The term "deblocking" as used herein refers to a technique used to reduce or eliminate blocky artifacts that can occur in compressed images or videos. These artifacts are a result of lossy compression algorithms, such as JPEG for images or various video codecs like H.264, H.265 (HEVC), and others, which divide the image or video into blocks and encode them with varying levels of quality. Blocky artifacts, also known as "blocking artifacts," become visible when the compression ratio is high, or the bitrate is low. These artifacts manifest as noticeable edges or discontinuities between adjacent blocks in the image or video. The result is a visual degradation characterized by visible square or rectangular regions, which can significantly reduce the overall quality and aesthetics of the content. Deblocking techniques are applied during the decoding process to mitigate or remove these artifacts. These techniques typically involve post-processing steps that smooth out the transitions between adjacent blocks, thus improving the overall visual appearance of the image or video. Deblocking filters are commonly used in video codecs to reduce the impact of blocking artifacts on the decoded video frames. A primary goal of deblocking is to enhance the perceptual quality of the compressed content, making it more visually appealing to viewers. It's important to note that deblocking is just one of many post-processing steps applied during the decoding and playback of compressed images and videos to improve their quality.

The term "forward error correction (FEC) coding" refers to a technique used in data transmission where the sender adds redundant data to its messages, allowing the receiver to detect and correct errors without needing to request retransmission of data.

The term "error concealment hints" refers to additional information embedded in the compressed bitstream that provides guidance on how to reconstruct or approximate data that may be lost or corrupted during transmission.

The term "data partitioning" refers to the process of dividing compressed image data into multiple segments based on their importance to image reconstruction, allowing for prioritized protection and transmission of critical image components.

The term "AI deblocking network" refers to a deep learning-based system designed to remove compression artifacts and enhance the quality of decompressed images, utilizing convolutional layers and channel-wise transformers to capture both local and global image features.

The term "error flags" refers to indicators embedded in the decoded data that mark regions of the image affected by transmission errors, guiding the AI deblocking network in its reconstruction efforts.

These definitions would help ensure clarity and precision in the patent application, particularly when describing the novel aspects of the error resilience subsystem and its integration with the AI deblocking process.

Conceptual Architecture

FIG. 1 is a block diagram illustrating an exemplary system architecture 100 for complex-valued SAR image compression with predictive recovery and error resilience, according to an embodiment. According to the embodiment, the system 100 comprises an encoder subsystem 110 configured to receive as input raw complex-valued (comprising both real (I) and imaginary (Q) components) SAR image data 101 and compress and compact the input data into a bitstream 102, an error resilience subsystem 1900 configured to apply error resilience techniques to the compressed bitstream, and a decoder subsystem 120 configured to receive and decompress the error-resilient bitstream 102 to output a reconstructed SAR image data 103. In some embodiments, the SAR image data is stored as a 32-bit floating-point value, covering a range (e.g., full range –R to +R) that varies depending on the specific dataset.

A data processor 111 may be present and configured to apply one or more data processing techniques to the raw input data to prepare the data for further processing by encoder subsystem 110. Data processing techniques can include (but are not limited to) any one or more of data cleaning, data transformation, encoding, dimensionality reduction, data slitting, and/or the like. In an embodiment, data processor 111 is configured to perform data clipping on the input data to a new range (e.g., cut range –C to +C). The selection of the new clipped range should be done such that only 1% of the total pixels in both I and Q channels are affected by the clipping action. Clipping the data limits the effect of extreme values while preserving the overall information contained in the SAR image.

After data processing, a quantizer 112 performs uniform quantization on the I and Q channels. Quantization is a process used in various fields, including signal processing, data compression, and digital image processing, to represent continuous or analog data using a discrete set of values. It involves mapping a range of values to a smaller set of discrete values. Quantization is commonly employed to reduce the storage requirements or computational complexity of digital data while maintaining an acceptable level of fidelity or accuracy. In an embodiment, quantizer 112 receives the clipped I/Q channels and quantizes them to 12 bits, thereby limiting the range of I and Q from 0 to 4096. The result is a more compact representation of the data. According to an implementation, the quantized I/Q images are then stored in uncompressed PNG format, which is used as input to a compressor 113. Compressor 113 may be configured to perform data compression on quantized I/Q images using a suitable conventional compression algorithm. According to an embodiment, compressor 113 may utilize High Efficiency Video Coding (HVEC) in intra mode to independently encode the I/Q image. In such embodiments, HVEC may be used at a decompressor 122 at decoder subsystem 120.

The resulting encoded bitstream may then be (optionally) input into a lossless compactor 114 which can apply data compaction techniques on the received encoded bitstream. An exemplary lossless data compaction system which may be integrated in an embodiment of system 100 is illustrated with reference to FIG. 4-7. For example, lossless compactor 114 may utilize an embodiment of data deconstruction engine 501 and library manager 403 to perform data compaction on the encoded bitstream. The output of the compactor is a compacted bitstream which is then processed by the error resilience subsystem 1900.

The error resilience subsystem 1900 applies error resilience techniques to the compressed bitstream. These techniques may include forward error correction coding, data partitioning based on importance, and embedding error concealment hints. The output of the error resilience subsystem is an error-resilient bitstream 102 which can be stored in a database, requiring much less space than would have been necessary to store the raw 32-bit complex-valued SAR image, or it can be transmitted to some other endpoint.

At the endpoint which receives the transmitted error-resilient bitstream 102 may be decoder subsystem 120 configured to restore the compacted data into the original SAR image by essentially reversing the process conducted at encoder subsystem 110. The received bitstream may first be (optionally) passed through a lossless compactor 121 which de-compacts the data into an encoded bitstream. In an embodiment, a data reconstruction engine 601 may be implemented to restore the compacted bitstream into its encoded format. The encoded bitstream may flow from compactor 121 to decompressor 122 wherein a data compaction technique may be used to decompress the encoded bitstream into the I/Q channels. In an embodiment, decompressor 122 uses HVEC techniques to decompress the encoded bitstream. It should be appreciated that lossless compactor components 114 and 121 are optional components of the system and may or may not be present in the system, dependent upon the embodiment.

According to the embodiment, an Artificial Intelligence (AI) deblocking network 123 is present and configured to utilize a trained deep learning network to enhance a decoded SAR image (i.e., I/Q channels) as part of the decoding process. AI deblocking network 123 may leverage the linear relationship demonstrated between I and Q images to enhance the reconstructed SAR image 103. Effectively, AI deblocking network 123 provides an improved and novel method for removing compression artifacts that occur during lossy compression/decompression using a network designed during the training process to simultaneously address the removal of artifacts and maintain fidelity of the amplitude information by optimizing the balance between SAR loss and amplitude loss, ensuring a comprehensive optimization of the network during the training stages. The AI deblocking network 123 also incorporates error correction and concealment based on the error resilience techniques applied by subsystem 1900.

The output of AI deblocking network 123 may be dequantized by quantizer 124, restoring the I/Q channels to their initial dynamic range. The dequantized SAR image may be reconstructed and output 103 by decoder subsystem 120 or stored in a database.

Figure 2A:
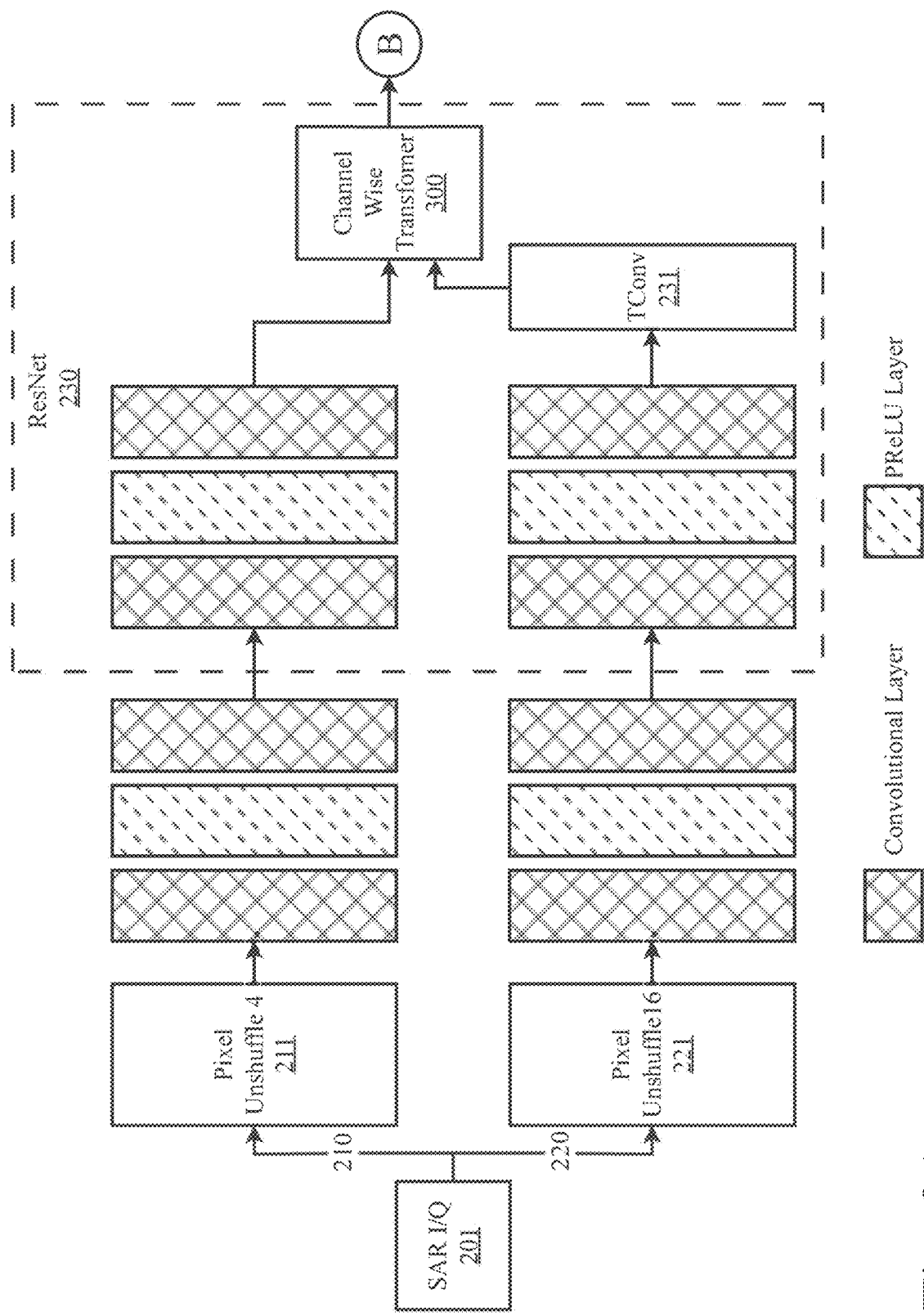
FIGS. 2A and 2B illustrate an exemplary architecture for an AI deblocking network configured to provide deblocking on dual-channel data stream comprising SAR I/Q data, according to an embodiment.
Figure 2B:
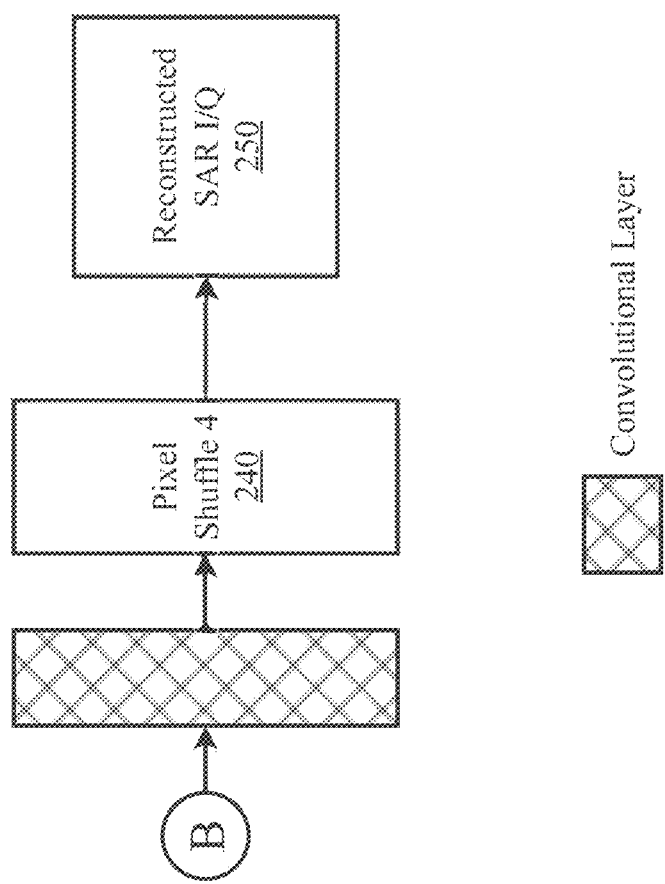

FIGS. 2A and 2B illustrate an exemplary architecture for an AI deblocking network configured to provide deblocking for dual-channel data stream comprising SAR I/Q data, according to an embodiment. In the context of this disclosure, dual-channel data refers to fact that SAR image signal can be represented as two (dual) components (i.e., I and Q) which are correlated to each other in some manner. In the case of I and Q, their correlation is that they can be transformed into phase and amplitude information and vice versa. AI deblocking network utilizes a deep learned neural network architecture for joint frequency and pixel domain learning. According to the embodiment, a network may be developed for joint learning across one or more domains. As shown, the top branch 210 is associated with the pixel domain learning and the bottom branch 220 is associated with the frequency domain learning. According to the embodiment, the AI deblocking network receives as input complex-valued SAR image I and Q channels 201 which, having been encoded via encoder 110, has subsequently been decompressed via decoder 120 before being passed to AI deblocking network for image enhancement via artifact removal. Inspired by the residual learning network and the MSAB attention mechanism, AI deblocking network employs resblocks that take two inputs. In some implementations, to reduce complexity the spatial resolution may be downsampled to one-half and one-fourth. During the final reconstruction the data may be upsampled to its original resolution. In one implementation, in addition to downsampling, the network employs deformable convolution to extract initial features, which are then passed to the resblocks. In an embodiment, the network comprises one or more resblocks and one or more convolutional filters. In an embodiment, the network comprises 8 resblocks and 64 convolutional filters.

Deformable convolution is a type of convolutional operation that introduces spatial deformations to the standard convolutional grid, allowing the convolutional kernel to adaptively sample input features based on the learned offsets. It's a technique designed to enhance the modeling of spatial relationships and adapt to object deformations in computer vision tasks. In traditional convolutional operations, the kernel's positions are fixed and aligned on a regular grid across the input feature map. This fixed grid can limit the ability of the convolutional layer to capture complex transformations, non-rigid deformations, and variations in object appearance. Deformable convolution aims to address this limitation by introducing the concept of spatial deformations. Deformable convolution has been particularly effective in tasks like object detection and semantic segmentation, where capturing object deformations and accurately localizing object boundaries are important. By allowing the convolutional kernels to adaptively sample input features from different positions based on learned offsets, deformable convolution can improve the model's ability to handle complex and diverse visual patterns.

According to an embodiment, the network may be trained as a two stage process, each utilizing specific loss functions. During the first stage, a mean squared error (MSE) function is used in the I/Q domain as a primary loss function for the AI deblocking network. The loss function of the SAR I/Q channel $L_{SAR}$ is defined as:

$$L_{SAR} = \mathbb{E}\left[\|I - I_{amp}\|_2\right]$$

Moving to the second stage, the network reconstructs the amplitude component and computes the amplitude loss using MSE as follows:

$$L_{amp} = \mathbb{E}\left[\|I_{amp} - I_{dec,amp}\|_2\right]$$

To calculate the overall loss, the network combines the SAR loss and the amplitude loss, incorporating a weighting factor, a, for the amplitude loss. The total loss is computed as:

$$L_{total} = L_{SAR} + \alpha \times L_{amp}$$

The weighting factor value may be selected based on the dataset used during network training. In an embodiment, the network may be trained using two different SAR datasets: the National Geospatial-Intelligence Agency (NGA) SAR dataset and the Sandia National Laboratories Mini SAR Complex Imagery dataset, both of which feature complex-valued SAR images. In an embodiment, the weighting factor is set to 0.0001 for the NGA dataset and 0.00005 for the Sandia dataset. By integrating both the SAR and amplitude losses in the total loss function, the system effectively guides the training process to simultaneously address the removal of the artifacts and maintain the fidelity of the amplitude information. The weighting factor, $\alpha$, enables AI deblocking network to balance the importance of the SAR loss and the amplitude loss, ensuring comprehensive optimization of the network during the training stages. In some implementations, diverse data augmentation techniques may be used to enhance the variety of training data. For example, techniques such as horizontal and vertical flops and rotations may be implemented on the training dataset. In an embodiment, model optimization is performed using MSE loss and Adam optimizer with a learning rate initially set to $1 \times 10^{-4}$ and decreased by a factor of 2 at epochs 100, 200, and 250, with a total of 300 epochs. In an implementation, the batch size is set to 256×256 with each batch containing 16 images.

Both branches first pass through a pixel unshuffling layer 211, 221 which implements a pixel unshuffling process on the input data. Pixel unshuffling is a process used in image processing to reconstruct a high-resolution image from a low-resolution image by rearranging or "unshuffling" the pixels. The process can involve the following steps, low-resolution input, pixel arrangement, interpolation, and enhancement. The input to the pixel unshuffling algorithm is a low-resolution image (i.e., decompressed, quantized SAR I/Q data). This image is typically obtained by downscaling a higher-resolution image such as during the encoding process executed by encoder 110. Pixel unshuffling aims to estimate the original high-resolution pixel values by redistributing and interpolating the low-resolution pixel values. The unshuffling process may involve performing interpolation techniques, such as nearest-neighbor, bilinear, or more sophisticated methods like bicubic or Lanczos interpolation, to estimate the missing pixel values and generate a higher-resolution image.

The output of the unshuffling layers 211, 221 may be fed into a series of layers which can include one or more convolutional layers and one or more parametric rectified linear unit (PReLU) layers. A legend is depicted for both FIG. 2A and FIG. 2B which indicates the cross hatched block represents a convolutional layer and the dashed block represents a PRELU layer. Convolution is the first layer to extract features from an input image. Convolution preserves the relationship between pixels by learning image features using small squares of input data. It is a mathematical operation that takes two inputs such as an image matrix and a filter or kernel. The embodiment features a cascaded ResNet-like structure comprising 8 ResBlocks to effectively process the input data. The filter size associated with each convolutional layer may be different. The filter size used for the pixel domain of the top branch may be different than the filter size used for the frequency domain of the bottom branch.

A PRELU layer is an activation function used in neural networks. The PRELU activation function extends the ReLU by introducing a parameter that allows the slope for negative values to be learned during training. The advantage of PRELU over ReLU is that it enables the network to capture more complex patterns and relationships in the data. By allowing a small negative slope for the negative inputs, the PRELU can learn to handle cases where the output should not be zero for all negative values, as is the case with the standard ReLU. In other implementations, other non-linear functions such as tanh or sigmoid can be used instead of PReLU.

After passing through a series of convolutional and PRELU layers, both branches enter the ResNet 230 which further comprises more convolutional and PRELU layers. The frequency domain branch is slightly different than the pixel domain branch once inside ResNet 230, specifically the frequency domain is processed by a transposed convolutional (TConv) layer 231. Transposed convolutions are a type of operation used in neural networks for tasks like image generation, image segmentation, and upsampling. They are used to increase the spatial resolution of feature maps while maintaining the learned relationships between features. Transposed convolutions aim to increase spatial dimensions of feature maps, effectively "upsampling" them. This is typically done by inserting zeros (or other values) between existing values to create more space for new values.

Inside ResBlock 230 the data associated with the pixel and frequency domains are combined back into a single stream by using the output of the Tconv 231 and the output of the top branch. The combined data may be used as input for a channel-wise transformer 300. In some embodiments, the channel-wise transformer may be implemented as a multi-scale attention block utilizing the attention mechanism. For more detailed information about the architecture and functionality of channel-wise transformer 300 refer to FIG. 3. The output of channel-wise transformer 300 may be a bit stream suitable for reconstructing the original SAR I/Q image. FIG. 2B shows the output of ResBlock 230 is passed through a final convolutional layer before being processed by a pixel shuffle layer 240 which can perform upsampling on the data prior to image reconstruction. The output of the AI deblocking network may be passed through a quantizer 124 for dequantization prior to producing a reconstructed SAR I/Q image 250.

The AI deblocking network has been further enhanced to incorporate error resilience information provided by the error resilience subsystem 1900. The network's input now includes not only the decompressed I and Q channels, but also error flags indicating regions affected by transmission errors and subsequently corrected or concealed. These error flags are processed alongside the image data through the network's convolutional and PRELU layers.

The ResNet 230 and channel-wise transformer 300 have been adapted to utilize this error information. The ResNet 230 now includes additional filters designed to identify and process artifacts resulting from both compression and error concealment. The channel-wise transformer 300 has been modified to adjust its attention mechanism based on the reliability of different image regions, as indicated by the error flags.

Furthermore, the loss function used during training has been updated to include an additional term that accounts for the error resilience information:

$$L\_total = L\_SAR + \alpha \times L\_amp + \beta \times L\_error$$

Where L_error is a new loss term that penalizes discrepancies between the reconstructed image and the original in areas flagged as affected by transmission errors. The β factor is a weighting term that balances the importance of this new error-aware loss.

This integration allows the AI deblocking network to not only remove compression artifacts but also to refine and improve upon the initial error concealment performed by the decoder, resulting in a more robust reconstruction process that can handle both compression and transmission errors effectively.

Figure 3:
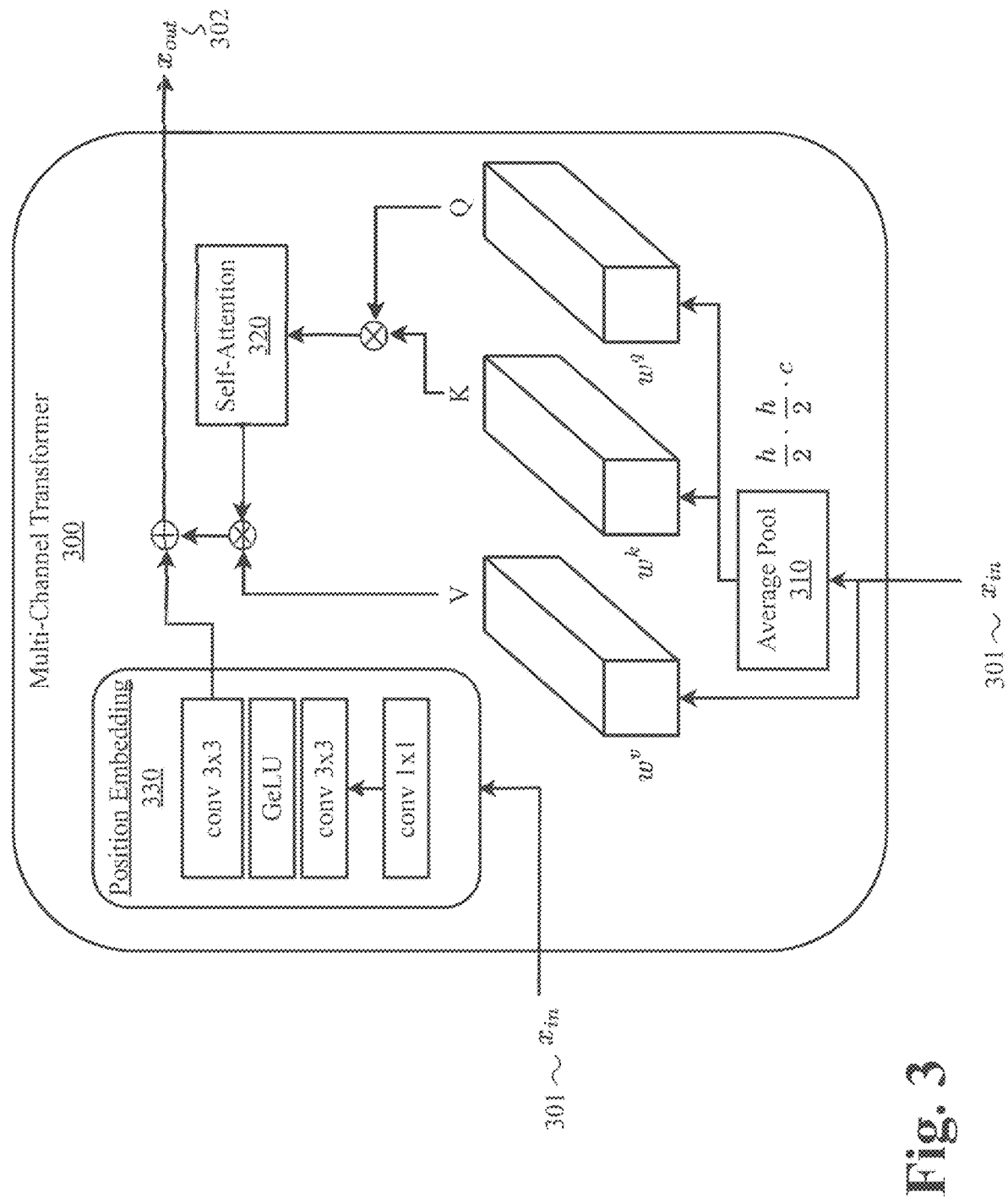
FIG. 3 is a block diagram illustrating an exemplary architecture for a component of the system for SAR image compression, the channel-wise transformer.

FIG. 3 is a block diagram illustrating an exemplary architecture for a component of the system for SAR image compression, the channel-wise transformer 300. According to the embodiment, channel-wise transformer receives an input signal, $x_{in}$ 301, the input signal comprising SAR I/Q data which is being processed by AI deblocking network 123. The input signal may be copied and follow two paths through multi-channel transformer 300.

A first path may process input data through a position embedding module 330 comprising series of convolutional layers as well as a Gaussian Error Linear Unit (GeLU). In traditional recurrent neural networks or convolutional neural networks, the order of input elements is inherently encoded through the sequential or spatial nature of these architectures. However, in transformer-based models, where the attention mechanism allows for non-sequential relationships between tokens, the order of tokens needs to be explicitly conveyed to the model. Position embedding module 330 may represent a feedforward neural network (position-wise feedforward layers) configured to add position embeddings to the input data to convey the spatial location or arrangement of pixels in an image. The output of position embedding module 330 may be added to the output of the other processing path the received input signal is processed through.

A second path may process the input data. It may first be processed via a channel-wise configuration and then through a self-attention layer 320. The signal may be copied/duplicated such that a copy of the received signal is passed through an average pool layer 310 which can perform a downsampling operation on the input signal. It may be used to reduce the spatial dimensions (e.g., width and height) of feature maps while retaining the most important information. Average pooling functions by dividing the input feature map into non-overlapping rectangular or square regions (often referred to as pooling windows or filters) and replacing each region with the average of the values within that region. This functions to downsample the input by summarizing the information within each pooling window.

Self-attention layer 320 may be configured to provide an attention to AI deblocking network 123. The self-attention mechanism, also known as intra-attention or scaled dot-product attention, is a fundamental building block used in various deep learning models, particularly in transformer-based models. It plays a crucial role in capturing contextual relationships between different elements in a sequence or set of data, making it highly effective for tasks involving sequential or structured data like complex-valued SAR I/Q channels. Self-attention layer 320 allows each element in the input sequence to consider other elements and weigh their importance based on their relevance to the current element. This enables the model to capture dependencies between elements regardless of their positional distance, which is a limitation in traditional sequential models like RNNs and LSTMs.

The input 301 and downsampled input sequence is transformed into three different representations: Query (Q), Key (K), and Value (V). These transformations ($w^V$, $w^K$, and $w^Q$) are typically linear projections of the original input. For each element in the sequence, the dot product between its Query and the Keys of all other elements is computed. The dot products are scaled by a factor to control the magnitude of the attention scores. The resulting scores may be normalized using a SoftMax function to get attention weights that represent the importance of each element to the current element. The Values (V) of all elements are combined using the attention weights as coefficients. This produces a weighted sum, where elements with higher attention weights contribute more to the final representation of the current element. The weighted sum is the output of the self-attention mechanism for the current element. This output captures contextual information from the entire input sequence.

The output of the two paths (i.e., position embedding module 330 and self-attention layer 320) may be combined into a single output data stream $x_{out}$ 302.

Figure 4:
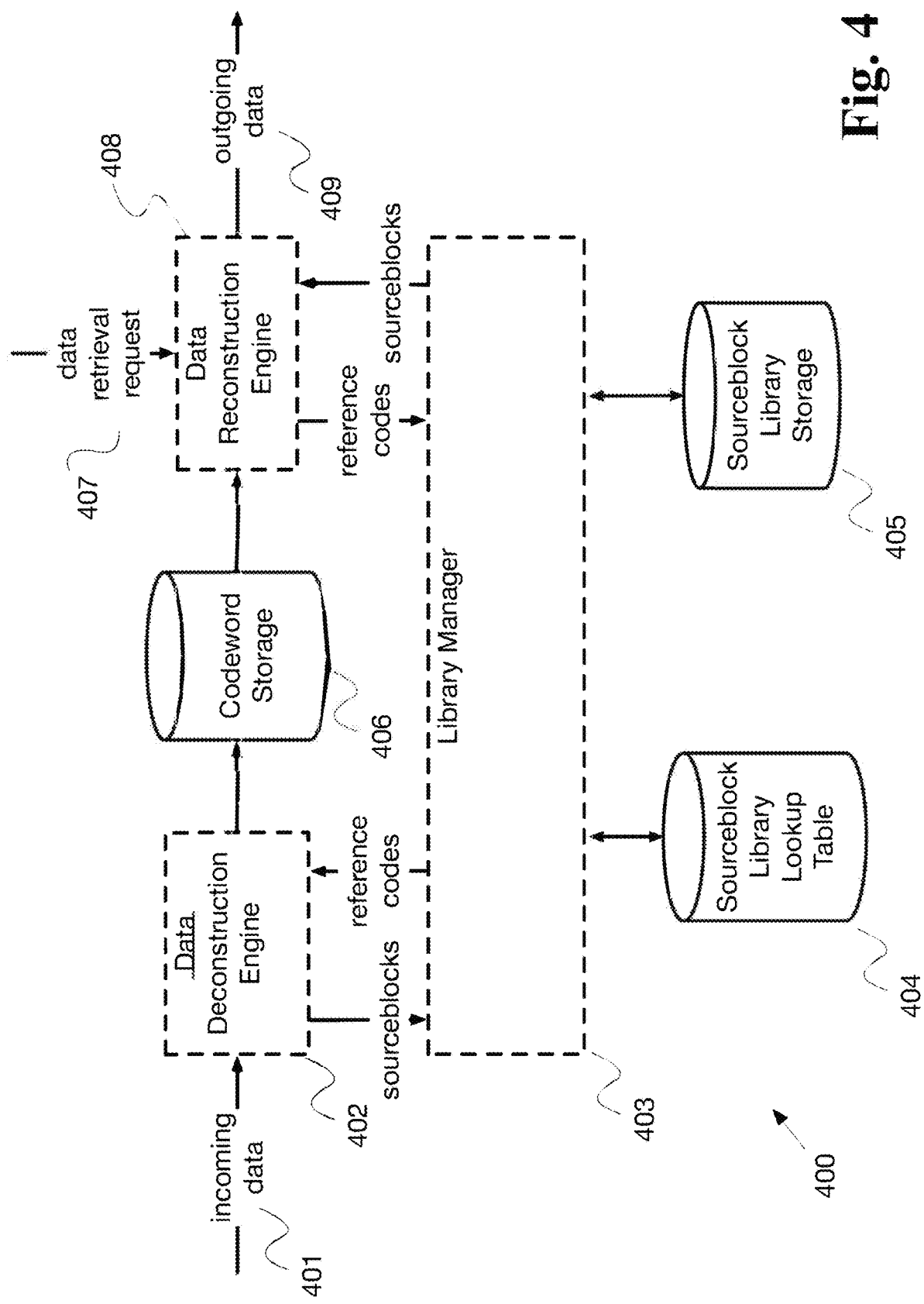
FIG. 4 is a block diagram illustrating an exemplary system architecture for providing lossless data compaction, according to an embodiment.

FIG. 4 is a block diagram illustrating an exemplary system architecture 400 for providing lossless data compaction, according to an embodiment. As incoming data 401 is received by data deconstruction engine 402. Data deconstruction engine 402 breaks the incoming data into sourceblocks, which are then sent to library manager 403. Using the information contained in sourceblock library lookup table 404 and sourceblock library storage 405, library manager 403 returns reference codes to data deconstruction engine 402 for processing into codewords, which are stored in codeword storage 106. When a data retrieval request 407 is received, data reconstruction engine 408 obtains the codewords associated with the data from codeword storage 406, and sends them to library manager 403. Library manager 403 returns the appropriate sourceblocks to data reconstruction engine 408, which assembles them into the proper order and sends out the data in its original form 409.

Figure 5:
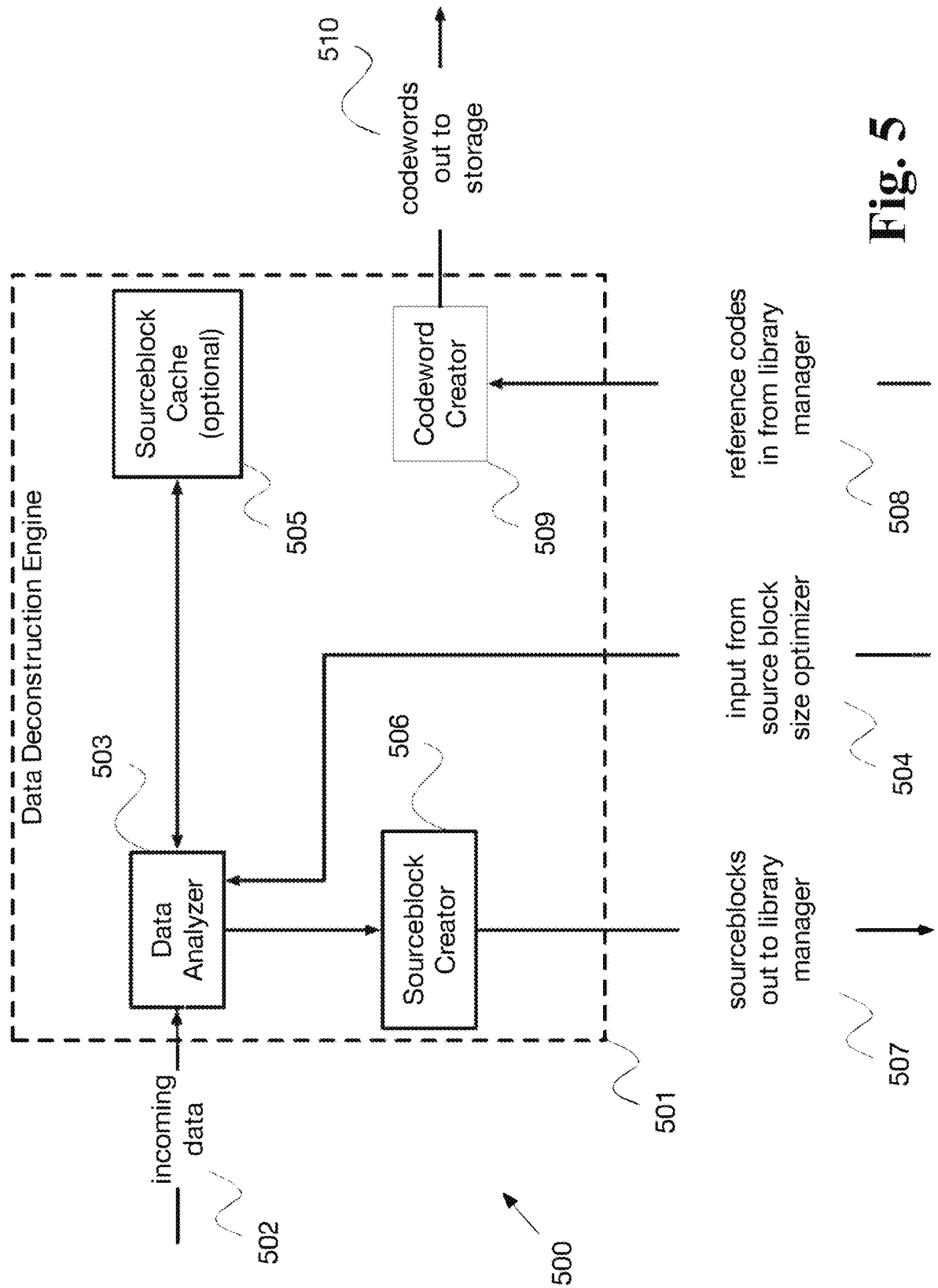
FIG. 5 is a diagram showing an embodiment of one aspect of the lossless data compaction system, specifically data deconstruction engine.

FIG. 5 is a diagram showing an embodiment of one aspect 500 of the system, specifically data deconstruction engine 501. Incoming data 502 is received by data analyzer 503, which optimally analyzes the data based on machine learning algorithms and input 504 from a sourceblock size optimizer, which is disclosed below. Data analyzer may optionally have access to a sourceblock cache 505 of recently processed sourceblocks, which can increase the speed of the system by avoiding processing in library manager 403. Based on information from data analyzer 503, the data is broken into sourceblocks by sourceblock creator 506, which sends sourceblocks 507 to library manager 403 for additional processing. Data deconstruction engine 501 receives reference codes 508 from library manager 403, corresponding to the sourceblocks in the library that match the sourceblocks sent by sourceblock creator 506, and codeword creator 509 processes the reference codes into codewords comprising a reference code to a sourceblock and a location of that sourceblock within the data set. The original data may be discarded, and the codewords representing the data are sent out to storage 510.

Figure 6:
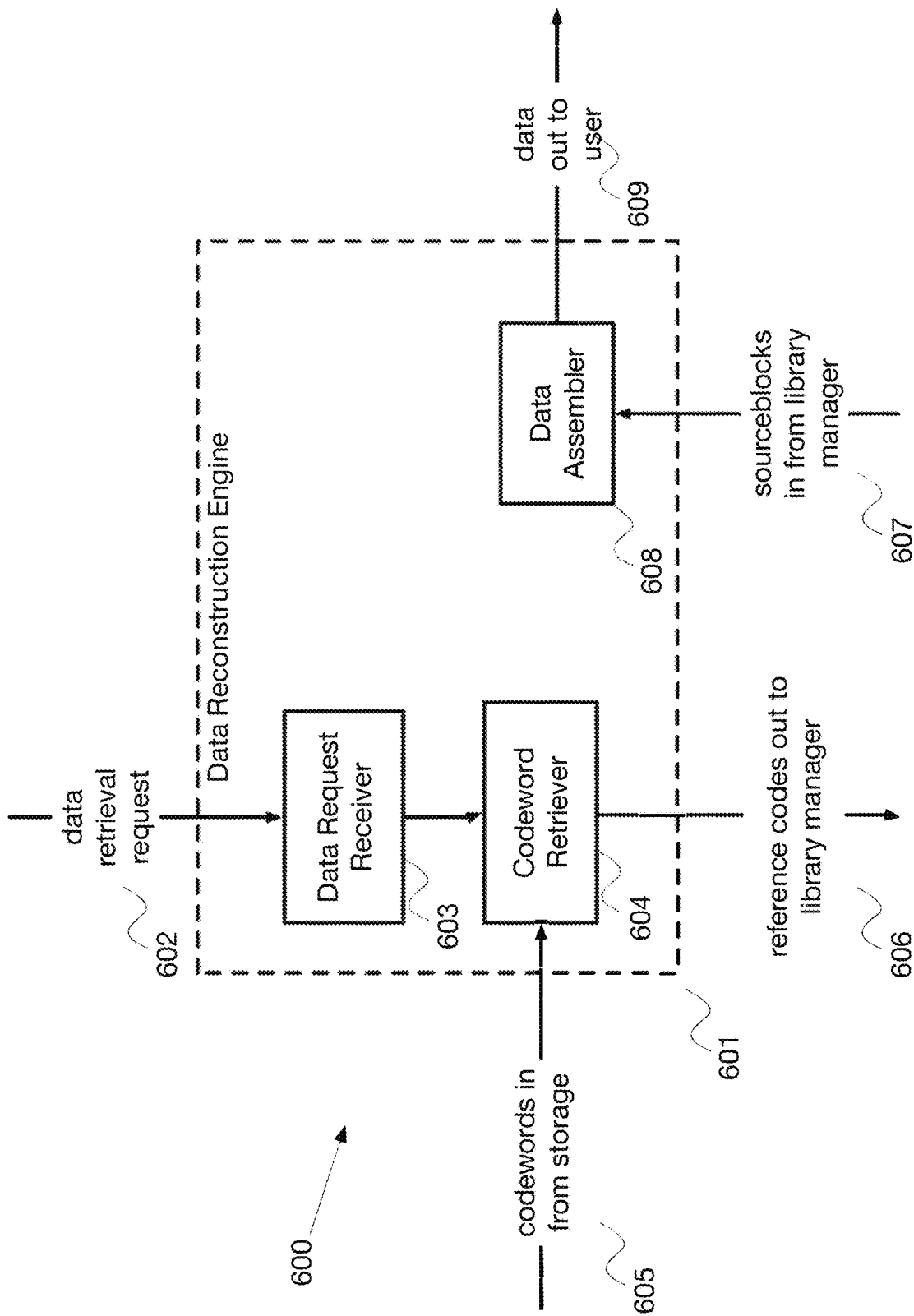
FIG. 6 is a diagram showing an embodiment of another aspect of lossless data compaction system 600, specifically data reconstruction engine.

FIG. 6 is a diagram showing an embodiment of another aspect of system 600, specifically data reconstruction engine 601. When a data retrieval request 602 is received by data request receiver 603 (in the form of a plurality of codewords corresponding to a desired final data set), it passes the information to data retriever 604, which obtains the requested data 605 from storage. Data retriever 604 sends, for each codeword received, a reference codes from the codeword 606 to library manager 403 for retrieval of the specific sourceblock associated with the reference code. Data assembler 608 receives the sourceblock 607 from library manager 403 and, after receiving a plurality of sourceblocks corresponding to a plurality of codewords, assembles them into the proper order based on the location information contained in each codeword (recall each codeword comprises a sourceblock reference code and a location identifier that specifies where in the resulting data set the specific sourceblock should be restored to. The requested data is then sent to user 609 in its original form.

Figure 7:
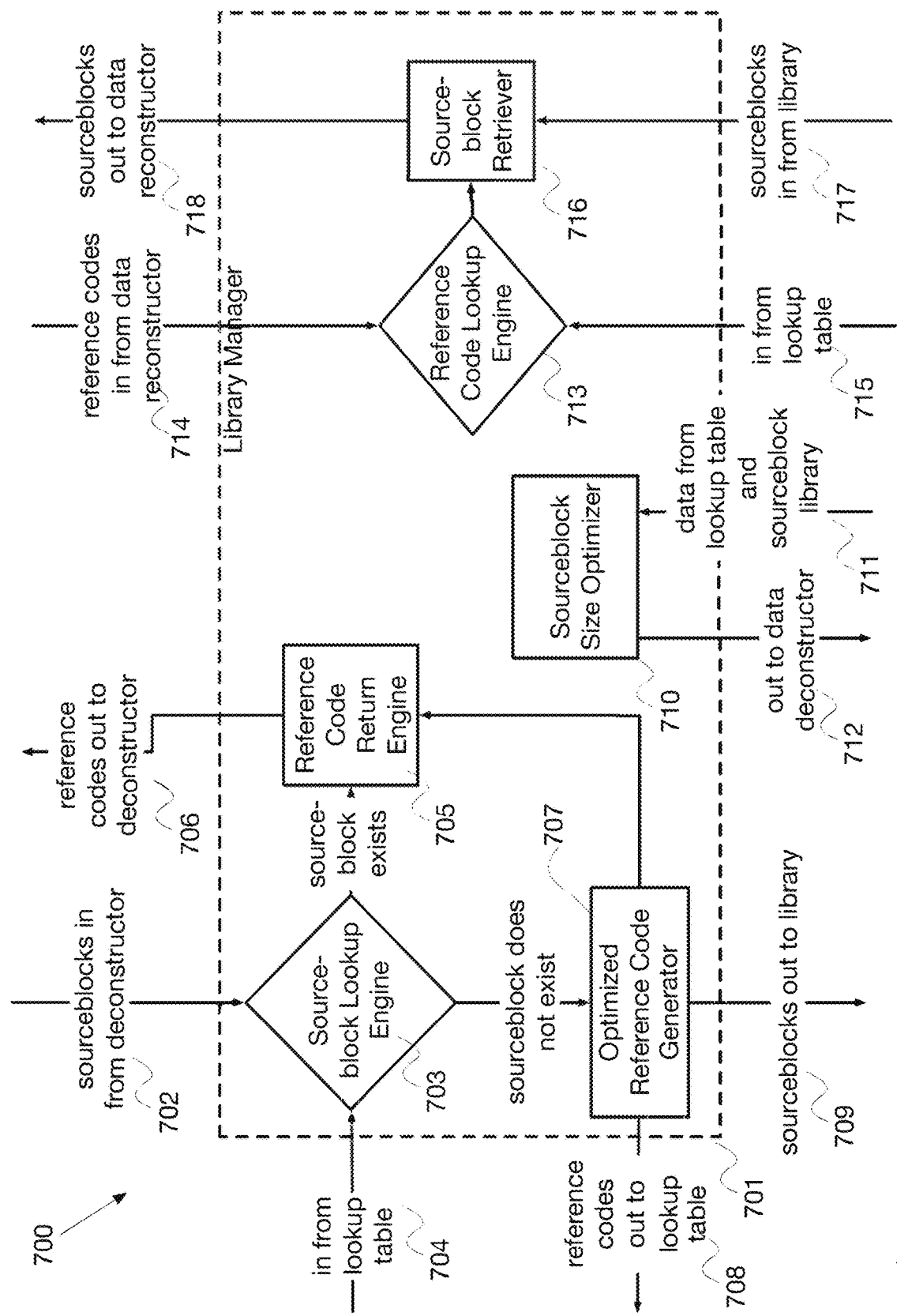
FIG. 7 is a diagram showing an embodiment of another aspect of lossless data compaction the system 700, specifically library manager.

FIG. 7 is a diagram showing an embodiment of another aspect of the system 700, specifically library manager 701. One function of library manager 701 is to generate reference codes from sourceblocks received from data deconstruction engine 701. As sourceblocks are received 702 from data deconstruction engine 501, sourceblock lookup engine 703 checks sourceblock library lookup table 704 to determine whether those sourceblocks already exist in sourceblock library storage 705. If a particular sourceblock exists in sourceblock library storage 105, reference code return engine 705 sends the appropriate reference code 706 to data deconstruction engine 601. If the sourceblock does not exist in sourceblock library storage 105, optimized reference code generator 407 generates a new, optimized reference code based on machine learning algorithms. Optimized reference code generator 707 then saves the reference code 708 to sourceblock library lookup table 704; saves the associated sourceblock 709 to sourceblock library storage 105; and passes the reference code to reference code return engine 705 for sending 706 to data deconstruction engine 501. Another function of library manager 701 is to optimize the size of sourceblocks in the system. Based on information 711 contained in sourceblock library lookup table 404, sourceblock size optimizer 410 dynamically adjusts the size of sourceblocks in the system based on machine learning algorithms and outputs that information 712 to data analyzer 603. Another function of library manager 701 is to return sourceblocks associated with reference codes received from data reconstruction engine 601. As reference codes are received 714 from data reconstruction engine 601, reference code lookup engine 713 checks sourceblock library lookup table 715 to identify the associated sourceblocks; passes that information to sourceblock retriever 716, which obtains the sourceblocks 717 from sourceblock library storage 405; and passes them 718 to data reconstruction engine 601.

Detailed Description of Exemplary Aspects

Figure 8:
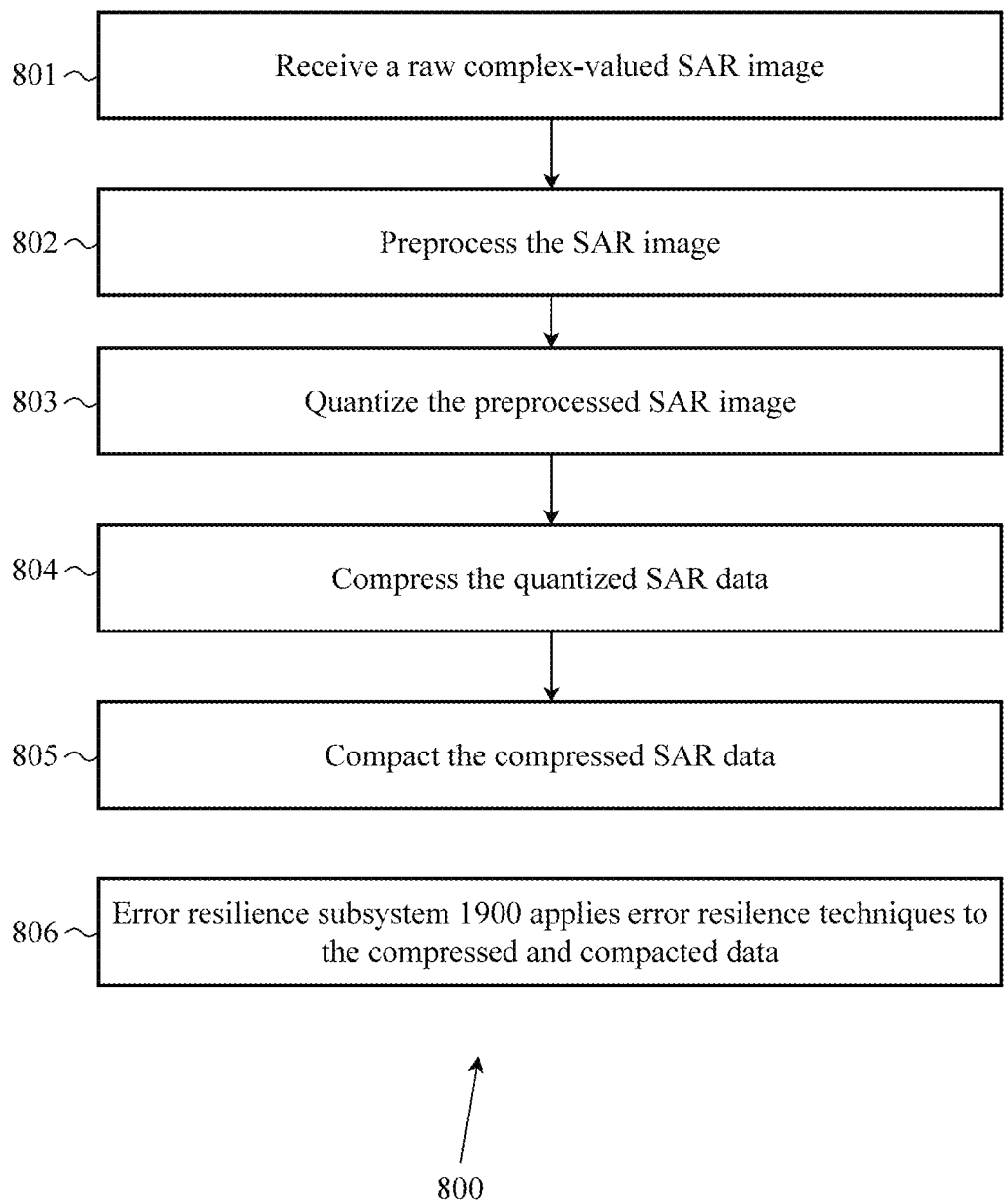
FIG. 8 is a flow diagram illustrating an exemplary method for complex-valued SAR image compression, according to an embodiment.

FIG. 8 is a flow diagram illustrating an exemplary method 800 for complex-valued SAR image compression with error resilience, according to an embodiment. According to the embodiment, the process begins at step 801 when encoder subsystem 110 receives a raw complex-valued SAR image. The complex-valued SAR image comprises both I and Q components. In some embodiments, the I and Q components may be processed as separate channels. At step 802, the received SAR image may be preprocessed for further processing by encoder subsystem 110. For example, the input image may be clipped or otherwise transformed in order to facilitate further processing. As a next step 803, the preprocessed data may be passed to quantizer 112 which quantizes the data. The next step 804 comprises compressing the quantized SAR data using a compression algorithm known to those with skill in the art. In an embodiment, the compression algorithm may comprise HEVC encoding for both compression and decompression of SAR data. At step 805, the compressed data may be compacted. The compaction may be a lossless compaction technique, such as those described with reference to FIGS. 4-7. Following compaction, at step 806, the error resilience subsystem 1900 applies error resilience techniques to the compressed and compacted data. These techniques include forward error correction coding, data partitioning based on importance, and embedding error concealment hints. The output of method 800 is a compressed, compacted, and error-resilient bit stream of SAR image data which can be stored in a database, requiring much less storage space than would be required to store the original, raw SAR image, while also being robust against transmission errors and data loss. The error-resilient bit stream may be transmitted to an endpoint for storage or processing. Transmission of the compressed, compacted, and error-resilient data requires less bandwidth and computing resources than transmitting raw SAR image data, while providing enhanced protection against transmission errors.

Figure 9:
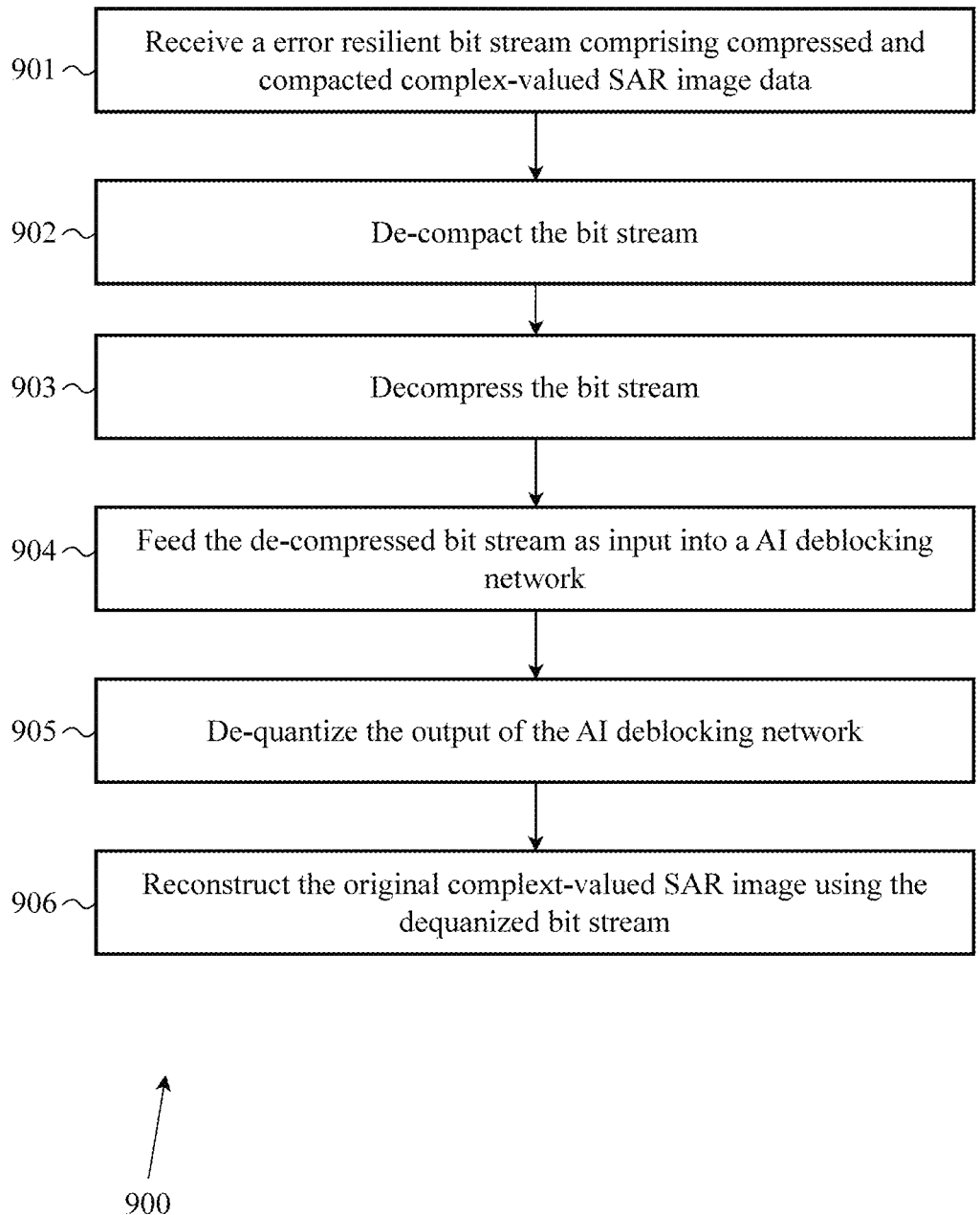
FIG. 9 is a flow diagram illustrating and exemplary method for decompression of a complex-valued SAR image, according to an embodiment.

FIG. 9 is a flow diagram illustrating an exemplary method 900 for decompression of a complex-valued SAR image with error resilience, according to an embodiment. According to the embodiment, the process begins at step 901 when decoder subsystem 120 receives a bit stream comprising compressed, compacted, and error-resilient complex-valued SAR image data. The error-resilient bit stream may be received from encoder subsystem 110 or from a suitable data storage device. At step 902, the received bit stream is first de-compacted to produce an encoded (compressed) bit stream. In some embodiments, data reconstruction engine 601 may be implemented as a system for de-compacting a received bit stream. The next step 903 comprises decompressing the de-compacted bit stream using a suitable compression algorithm known to those with skill in the art, such as HEVC encoding. During this step, the system also performs error correction and concealment based on the applied error resilience techniques, utilizing the forward error correction coding, data partitioning, and error concealment hints embedded in the bit stream. At step 904, the de-compressed and error-corrected SAR data is fed as input into AI deblocking network 123 for image enhancement via a trained deep learning network. The AI deblocking network utilizes a series of convolutional layers and/or ResBlocks to process the input data and perform artifact removal on the de-compressed SAR image data. It also incorporates the error concealment hints to further improve image quality. AI deblocking network is further configured to implement an attention mechanism for the model to capture dependencies between elements regardless of their positional distance. In an embodiment, during training of AI deblocking network, the amplitude loss in conjunction with the SAR loss is computed and accounted for, further boosting the compression performance of system 100. The output of AI deblocking network 123 is sent to a quantizer 124 which executes step 905 by de-quantizing the output bit stream from AI deblocking network. As a last step 906, the system reconstructs the original complex-valued SAR image using the de-quantized bit stream, resulting in a high-quality image that has been effectively protected against transmission errors and data loss.

Figure 10:
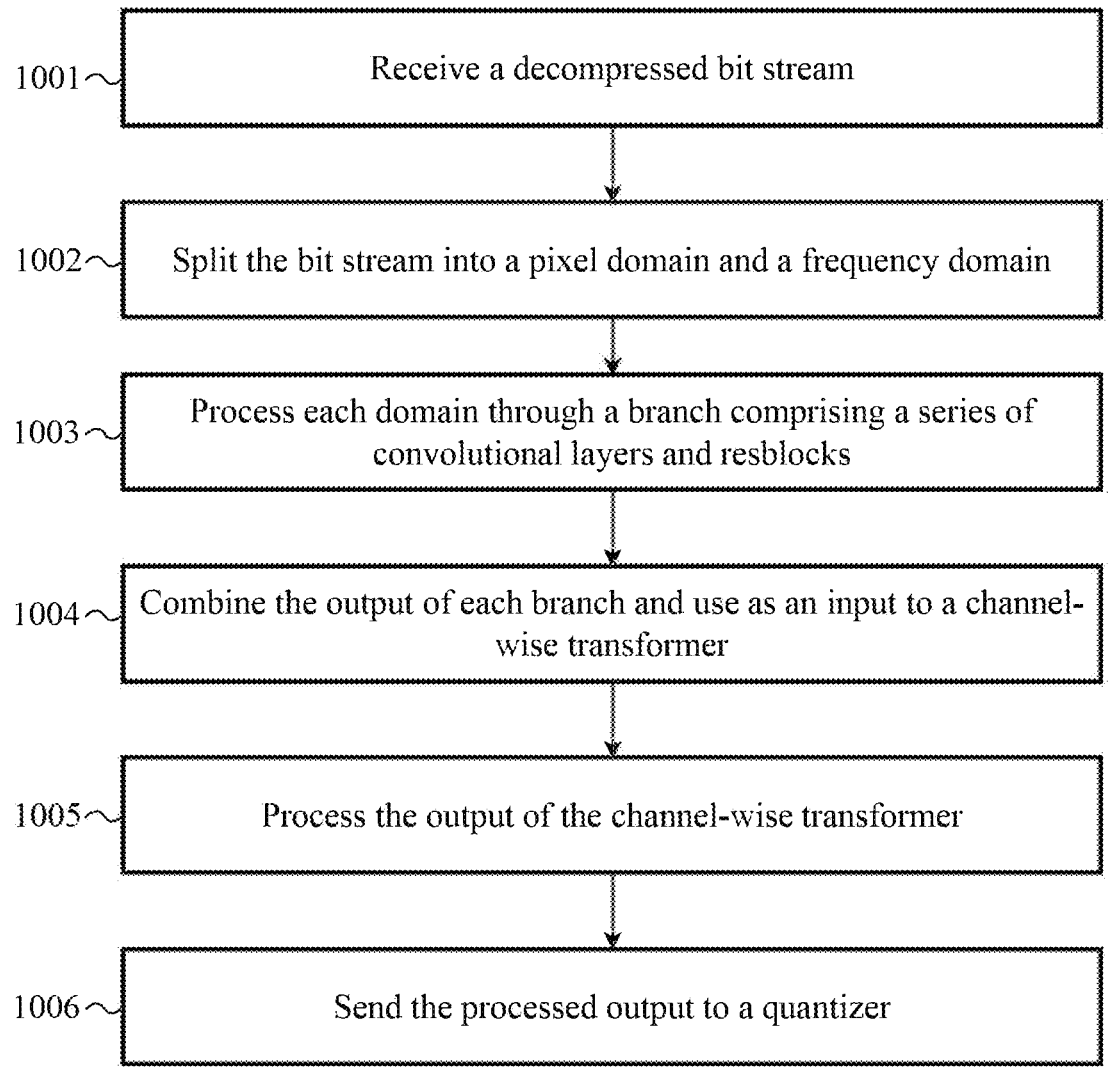
FIG. 10 is a flow diagram illustrating an exemplary method for deblocking using a trained deep learning algorithm, according to an embodiment.

FIG. 10 is a flow diagram illustrating an exemplary method for deblocking using a trained deep learning algorithm, according to an embodiment. According to the embodiment, the process begins at step 1001 wherein the trained deep learning algorithm (i.e., AI deblocking network 123) receives a decompressed bit stream comprising SAR I/Q image data. At step 1002, the bit stream is split into a pixel domain and a frequency domain. Each domain may pass through AI deblocking network, but have separate, almost similar processing paths. As a next step 1003, each domain is processed through its respective branch, the branch comprising a series of convolutional layers and ResBlocks. In some implementations, frequency domain may be further processed by a transpose convolution layer. The two branches are combined and used as input for a multi-channel transformer with attention mechanism at step 1004. Multi-channel transformer 300 may perform functions such as downsampling, positional embedding, and various transformations, according to some embodiments. Multi-channel transformer 300 may comprise one or more of the following components: channel-wise attention, transformer self-attention, and/or feedforward layers. In an implementation, the downsampling may be performed via average pooling. As a next step 1005, the AI deblocking network processes the output of the channel-wise transformer. The processing may include the steps of passing the output through one or more convolutional or PRELU layers and/or upsampling the output. As a last step 1006, the processed output may be forwarded to quantizer 124 or some other endpoint for storage or further processing.

Figure 11A:
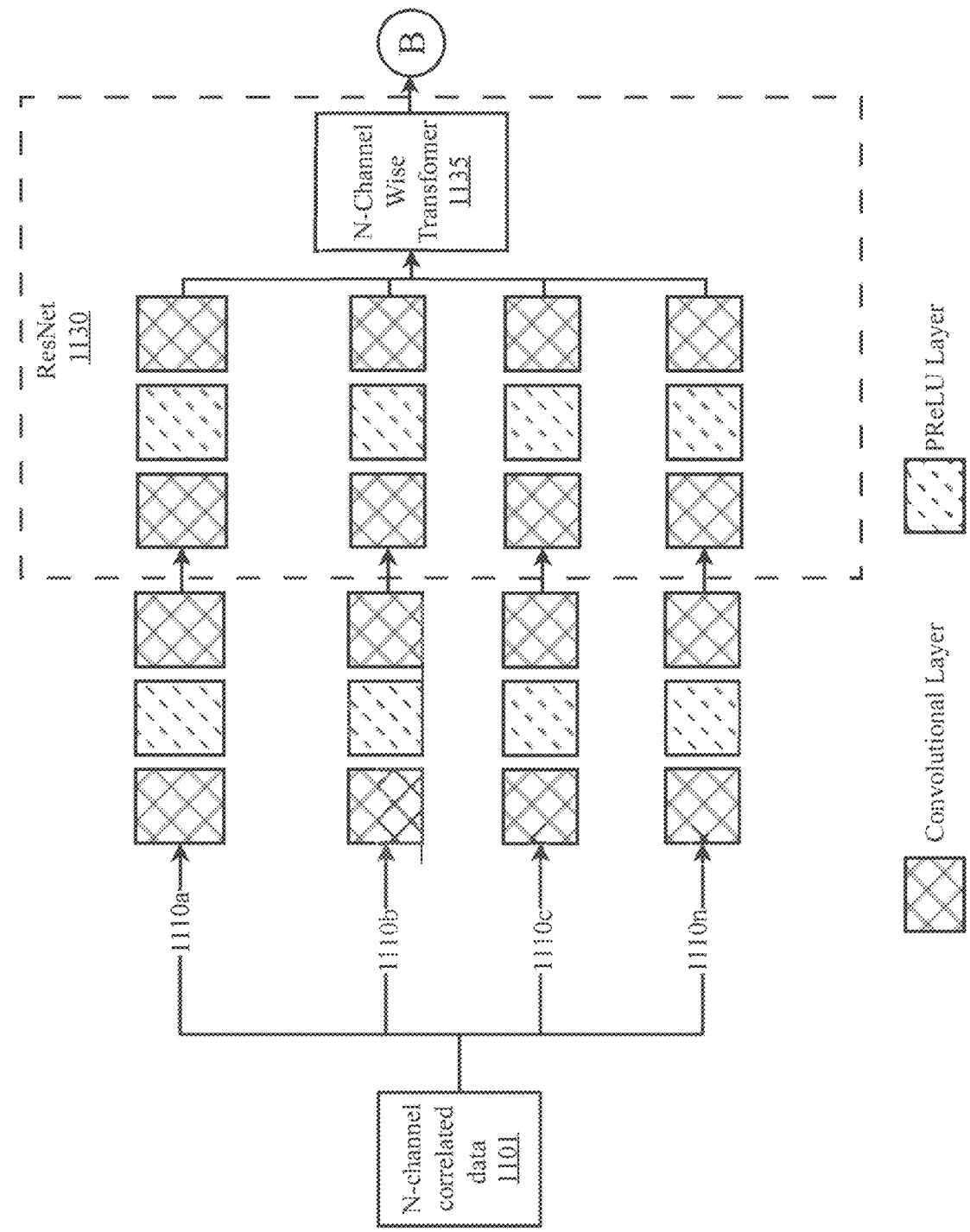
FIGS. 11A and 11B illustrate an exemplary architecture for an AI deblocking network configured to provide deblocking for a general N-channel data stream, according to an embodiment.
Figure 11B:
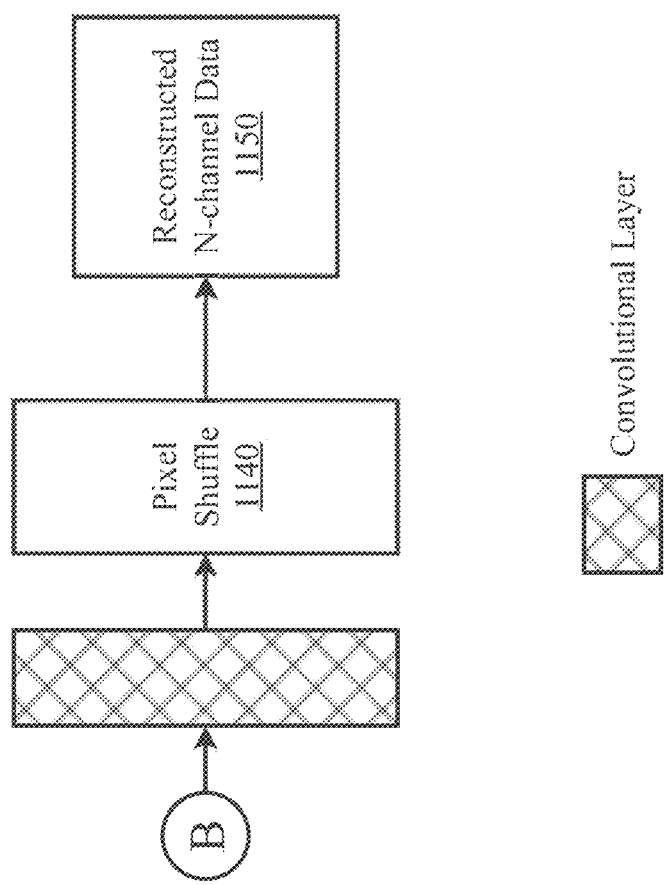

FIGS. 11A and 11B illustrate an exemplary architecture for an AI deblocking network configured to provide deblocking for a general N-channel data stream, according to an embodiment. The term "N-channel" refers to data that is composed of multiple distinct channels of modalities, where each channel represents a different aspect of type of information. These channels can exist in various forms, such as sensor readings, image color channels, or data streams, and they are often used together to provide a more comprehensive understanding of the underlying phenomenon. Examples of N-channel data include, but is not limited to, RGB images (e.g., in digital images, the red, green, and blue channels represent different color information; combining these channels allows for the representation of a wide range of colors), medical imaging (e.g., may include Magnetic Resonance Imaging scans with multiple channels representing different tissue properties, or Computed Tomography scans with channels for various types of X-ray attenuation), audio data (e.g., stereo or multi-channel audio recordings where each channel corresponds to a different microphone or audio source), radar and lidar (e.g., in autonomous vehicles, radar and lidar sensors provide multi-channel data, with each channel capturing information about objects' positions, distances, and reflectivity) SAR image data, text data (e.g., in natural language processing, N-channel data might involve multiple sources of text, such as social media posts and news articles, each treated as a separate channel to capture different textual contexts), sensor networks (e.g., environmental monitoring systems often employ sensor networks with multiple sensors measuring various parameters like temperature, humidity, air quality, and more. Each sensor represents a channel), climate data, financial data, and social network data.

The disclosed AI deblocking network may be trained to process any type of N-channel data, if the N-channel data has a degree of correlation. More correlation between and among the multiple channels yields a more robust and accurate AI deblocking network capable of performing high quality compression artifact removal on the N-channel data stream. A high degree of correlation implies a strong relationship between channels. Using SAR image data has been used herein as an exemplary use case for an AI deblocking network for a N-channel data stream comprising 2 channels, the In-phase and Quadrature components (i.e., I and Q, respectively).

Exemplary data correlations that can be exploited in various implementations of AI deblocking network can include, but are not limited to, spatial correlation, temporal correlation, cross-sectional correlation (e.g., This occurs when different variables measured at the same point in time are related to each other), longitudinal correlation, categorical correlation, rank correlation, time-space correlation, functional correlation, and frequency domain correlation, to name a few.

As shown, an N-channel AI deblocking network may comprise a plurality of branches 1110a-n. The number of branches is determined by the number of channels associated with the data stream. Each branch may initially be processed by a series of convolutional and PRELU layers. Each branch may be processed by resnet 1130 wherein each branch is combined back into a single data stream before being input to N-channel wise transformer 1135, which may be a specific configuration of transformer 300. The output of N-channel wise transformer 1135 may be sent through a final convolutional layer before passing through a last pixel shuffle layer 1140. The output of AI deblocking network for N-channel video/image data is the reconstructed N-channel data 1150.

As an exemplary use case, video/image data may be processed as a 3-channel data stream comprising Green (G), Red (R), and Blue (B) channels. An AI deblocking network may be trained that provides compression artifact removal of video/image data. Such a network would comprise 3 branches, wherein each branch is configured to process one of the three channels (R,G, or B). For example, branch 1110*a* may correspond to the R-channel, branch 1110*b* to the G-channel, and branch 1110*c* to the B-channel. Each of these channels may be processed separately via their respective branches before being combined back together inside resnet 1130 prior to being processed by N-channel wise transformer 1135.

As another exemplary use case, a sensor network comprising a half dozen sensors may be processed as a 6-channel data stream. The exemplary sensor network may include various types of sensors collecting different types of, but still correlated, data. For example, sensor network can include a pressure sensor, a thermal sensor, a barometer, a wind speed sensor, a humidity sensor, and an air quality sensor. These sensors may be correlated to one another in at least one way. For example, the six sensors in the sensor network may be correlated both temporally and spatially, wherein each sensor provides a time series data stream which can be processed by one of the 6 channels 1110*a-n* of AI deblocking network. As long as AI deblocking network is trained on N-channel data with a high degree of correlation and which is representative of the N-channel data it will encounter during model deployment, it can reconstruct the original data using the methods described herein.

Figure 12:
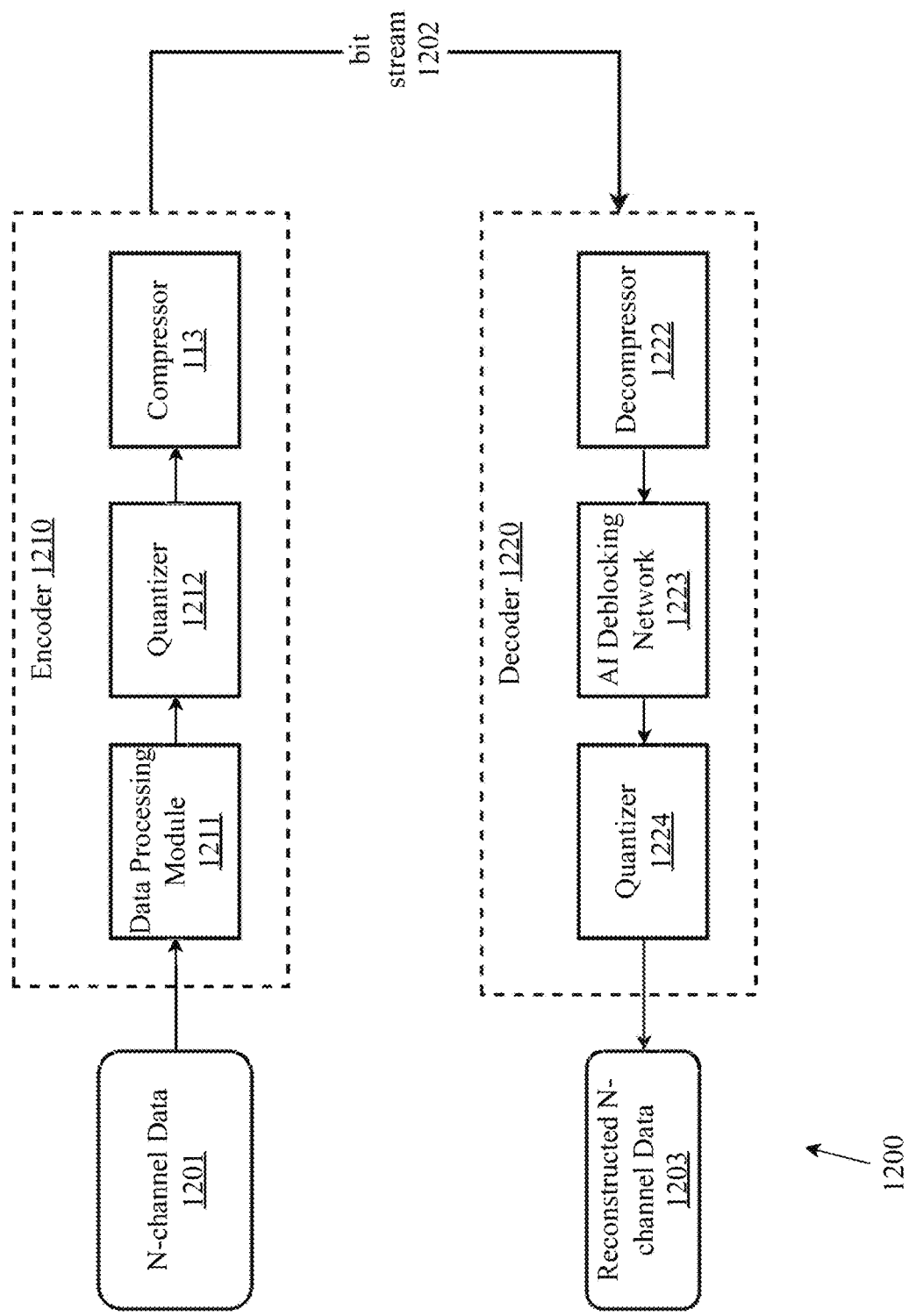
FIG. 12 is a block diagram illustrating an exemplary system architecture for N-channel data compression with predictive recovery, according to an embodiment.

FIG. 12 is a block diagram illustrating an exemplary system architecture 1200 for N-channel data compression with predictive recovery, according to an embodiment. According to the embodiment, the system 1200 comprises an encoder module 1210 configured to receive as input N-channel data 1201 and compress and compact the input data into a bitstream 102, and a decoder module 120 configured to receive and decompress the bitstream 1202 to output a reconstructed N-channel data 1203.

A data processor module 1211 may be present and configured to apply one or more data processing techniques to the raw input data to prepare the data for further processing by encoder 1210. Data processing techniques can include (but are not limited to) any one or more of data cleaning, data transformation, encoding, dimensionality reduction, data slitting, and/or the like.

After data processing, a quantizer 1212 performs uniform quantization on the n-number of channels. Quantization is a process used in various fields, including signal processing, data compression, and digital image processing, to represent continuous or analog data using a discrete set of values. It involves mapping a range of values to a smaller set of discrete values. Quantization is commonly employed to reduce the storage requirements or computational complexity of digital data while maintaining an acceptable level of fidelity or accuracy. Compressor 1213 may be configured to perform data compression on quantized N-channel data using a suitable conventional compression algorithm.

The resulting encoded bitstream may then be (optionally) input into a lossless compactor (not shown) which can apply data compaction techniques on the received encoded bitstream. An exemplary lossless data compaction system which may be integrated in an embodiment of system 1200 is illustrated with reference to FIG. 4-7. For example, lossless compactor may utilize an embodiment of data deconstruction engine 501 and library manager 403 to perform data compaction on the encoded bitstream. The output of the compactor is a compacted bitstream 1202 which can be stored in a database, requiring much less space than would have been necessary to store the raw N-channel data, or it can be transmitted to some other endpoint.

At the endpoint which receives the transmitted compacted bitstream 1202 may be decoder module 1220 configured to restore the compacted data into the original SAR image by essentially reversing the process conducted at encoder module 1210. The received bitstream may first be (optionally) passed through a lossless compactor which de-compacts the data into an encoded bitstream. In an embodiment, a data reconstruction engine 601 may be implemented to restore the compacted bitstream into its encoded format. The encoded bitstream may flow from compactor to decompressor 1222 wherein a data compaction technique may be used to decompress the encoded bitstream into the I/Q channels. It should be appreciated that lossless compactor components are optional components of the system, and may or may not be present in the system, dependent upon the embodiment.

According to the embodiment, an Artificial Intelligence (AI) deblocking network 1223 is present and configured to utilize a trained deep learning network to provide compression artifact removal as part of the decoding process. AI deblocking network 1223 may leverage the relationship demonstrated between the various N-channels of a data stream to enhance the reconstructed N-channel data 1203. Effectively, AI deblocking network 1223 provides an improved and novel method for removing compression artifacts that occur during lossy compression/decompression using a network designed during the training process to simultaneously address the removal of artifacts and maintain fidelity of the original N-channel data signal, ensuring a comprehensive optimization of the network during the training stages.

The output of AI deblocking network 1223 may be dequantized by quantizer 1224, restoring the n-channels to their initial dynamic range. The dequantized n-channel data may be reconstructed and output 1203 by decoder module 1220 or stored in a database.

Figure 13:
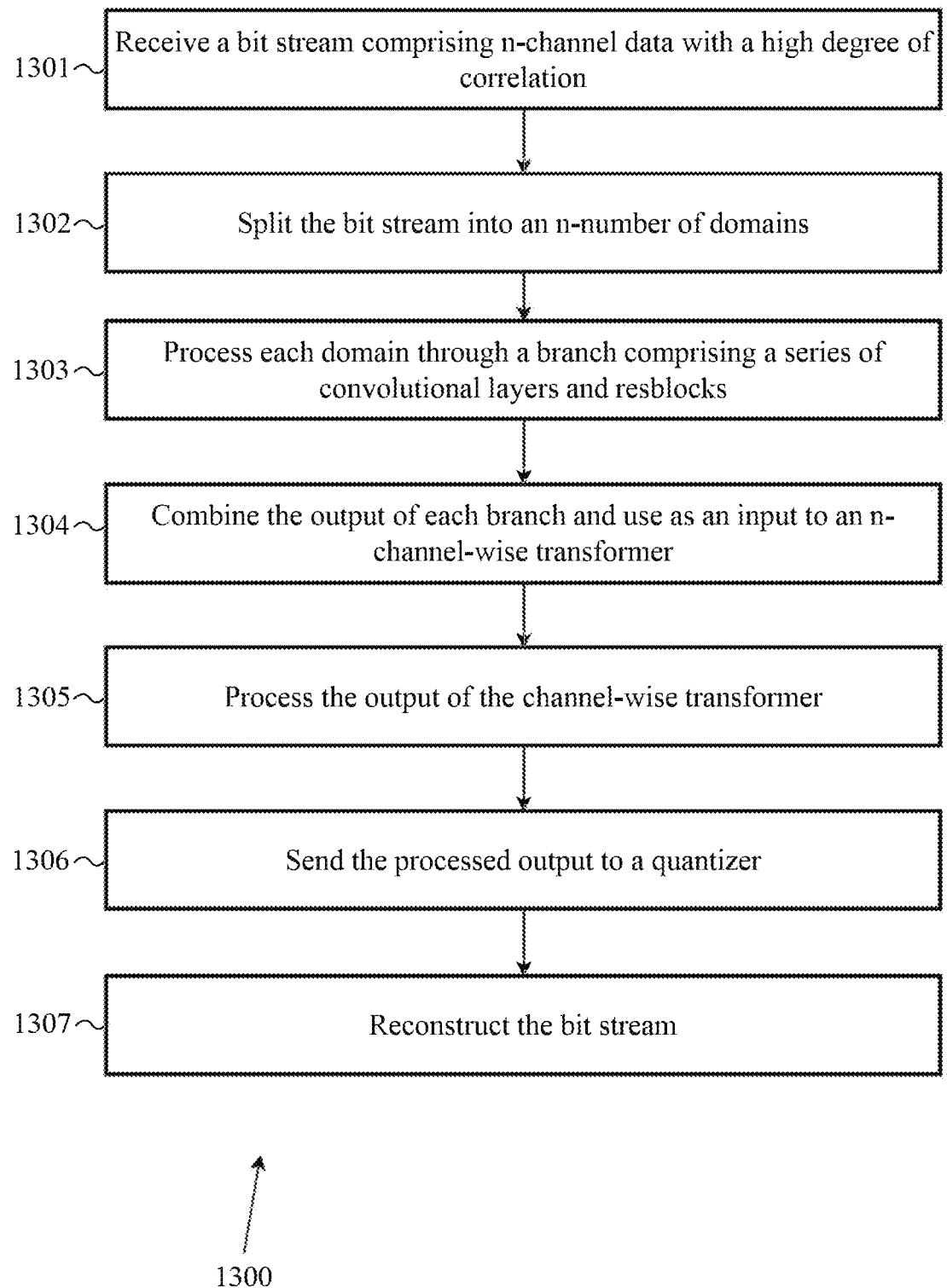
FIG. 13 is a flow diagram illustrating an exemplary method for processing a compressed n-channel bit stream using an AI deblocking network, according to an embodiment.

FIG. 13 is a flow diagram illustrating an exemplary method for processing a compressed n-channel bit stream using an AI deblocking network, according to an embodiment. According to the embodiment, the process begins at step 1301 when a decoder module 1220 receives, retrieves, or otherwise obtains a bit stream comprising n-channel data with a high degree of correlation. At step 1302, the bit stream is split into an n-number of domains. For example, if the received bit stream comprises image data in the form of R-,G,- and B-channels, then the bit stream would be split into 3 domains, one for each color (RGB). At step 1303, each domain is processed through a branch comprising a series of convolutional layers and ResBlocks. The number of layers and composition of said layers may depend upon the embodiment and the n-channel data being processed. At step 1304, the output of each branch is combined back into a single bitstream and used as an input into an n-channel wise transformer 1135. At step 1305, the output of the channel-wise transformer may be processed through one or more convolutional layers and/or transformation layers, according to various implementations. At step 1306, the processed output may be sent to a quantizer for upscaling and other data processing tasks. As a last step 1307, the bit stream may be reconstructed into its original uncompressed form.

Figure 14:
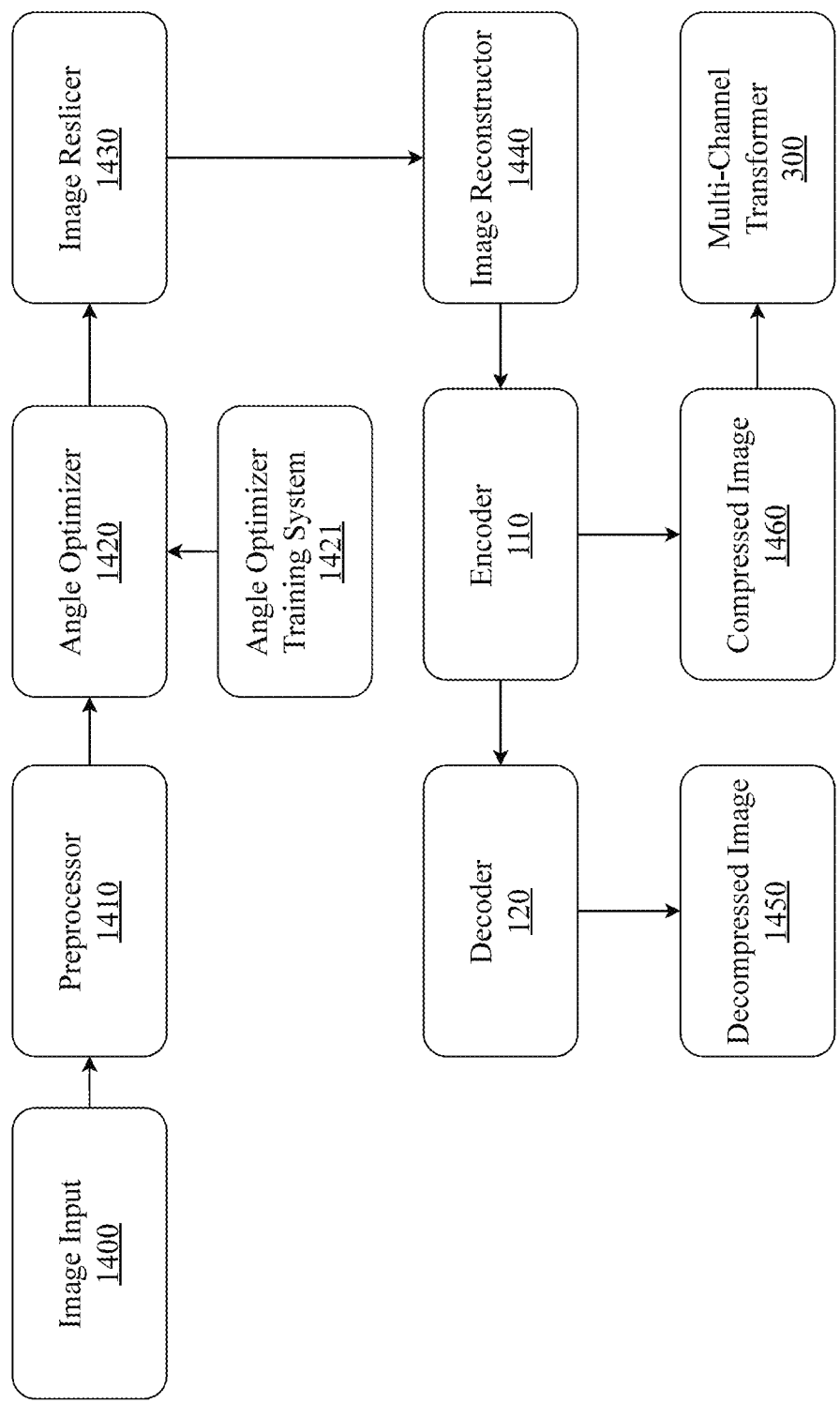
FIG. 14 is a block diagram illustrating an exemplary architecture for a system and method for image series transformation for optimal compressibility with neural upsampling.

FIG. 14 is a block diagram illustrating an exemplary architecture for a system and method for image series transformation for optimal compressibility with neural upsampling. This system is suited for applications involving series of images, such as slices in a CAT scan or successive aerial images of a location on Earth. For instance, in a CAT scan of a patient's abdomen, the system can process hundreds of parallel slices, each representing a cross-section of the body at a specific position along the scanning axis. Similarly, in aerial photography, the system can handle a series of overlapping images captured by a drone or satellite over a specific geographic area.

The system receives an image input 1400, which represents a series of images. In the case of a CAT scan, these images would be parallel slices perpendicular to the axis of motion of the target as the imaging device moves over the target. For example, a CAT scan of a patient's brain might consist of 200 slices, each 1 mm thick, covering the entire brain volume. For aerial photography, the images may be successive photographs of a ground location taken by an imaging platform in motion. For instance, a drone equipped with a high-resolution camera might capture a series of images of a city block from different angles as it flies over the area.

A preprocessor 1410 prepares the input image series for further processing. This may involve data cleaning, normalization, or other transformations specific to the application domain. For example, in a CAT scan, the preprocessor might apply noise reduction algorithms to improve the signal-to-noise ratio of the images or normalize the intensity values across slices to ensure consistent brightness and contrast. In aerial photography, the preprocessor may perform image registration to correct for platform motion and create a consistent 3D representation of the ground location. This could involve using feature detection and matching algorithms to align overlapping images and create a seamless mosaic of the area.

An angle optimizer 1420 is responsible for determining the optimal rotation angle for reslicing the image series to achieve maximum compressibility. In one embodiment, the optimizer 1420 may utilize machine learning infrastructure to analyze the image series and predict the best slicing angle for optimal compression. The angle optimizer 1420 may employ various machine learning methods to accomplish this task. For example, it might use a convolutional neural network (CNN) trained on a dataset of image series with known compressibility at different angles. The CNN would learn to extract relevant features from the input images and predict the optimal slicing angle based on these features. Another approach could involve using a decision tree or random forest algorithm to identify the most informative image characteristics for determining the best slicing angle. These algorithms can handle complex, non-linear relationships between image features and compressibility, making them well-suited for this optimization task. The angle optimizer 1420 may also utilize clustering techniques, such as k-means or hierarchical clustering, to group similar image series together based on their compressibility profiles. By analyzing the common properties of highly compressible image series, the angle optimizer 1420 can infer the optimal slicing angle for new, unseen datasets. Alternatively, the angle optimizer 1420 could employ reinforcement learning algorithms to iteratively explore different slicing angles and learn the optimal strategy over time. The reinforcement learning agent would receive feedback in the form of compression ratios achieved at each angle and adapt its strategy to maximize the overall compressibility of the image series.

An image reslicer 1430 takes the output from the angle optimizer 1420 and reslices the image series accordingly. This process involves transforming the series of images by combining data from multiple original images to create a new series at the optimal rotation angle. For example, in a CAT scan, the image reslicer 1430 might use interpolation techniques, such as trilinear interpolation, to estimate the pixel values in the new slices based on the surrounding pixels in the original slices. This would effectively rotate the image set from a series perpendicular to the axis of motion to a series at the optimal angle off the axis of motion. In the CAT scan scenario, this would effectively rotate the image set from a series perpendicular to the axis of motion to a series at the optimal angle off the axis of motion. For instance, if the optimal angle is determined to be 45 degrees, the image reslicer 1430 would generate a new series of slices that are oriented at a 45-degree angle relative to the original axial slices. For aerial photography, the image reslicer 1430 may adjust for platform motion and topographical features to create an optimally resliced image series. This could involve using 3D projection and mapping techniques to transform the images into a common coordinate system and align them based on the optimal angle. For example, if the optimal angle is found to be 60 degrees relative to the ground plane, the image reslicer 1430 may create a new series of images that are oriented at this angle, effectively minimizing the impact of perspective distortion and enhancing compressibility.

An image reconstructor 1440 compiles the optimized slices back into a coherent image series that can be efficiently compressed and decompressed. It takes the output from the image reslicer 1430 and reassembles the slices, ensuring that the spatial relationships and continuity of the original image series are preserved. For example, in a CAT scan, the image reconstructor 140 might use the position and orientation information associated with each resliced slice to stack them together in the correct order and alignment. This would involve applying the inverse of the rotation transformation used by the image reslicer 1430 to restore the original geometry of the image series. In aerial photography, the image reconstructor 1440 may use the mapping and projection information to stitch the resliced images together into a seamless image that accurately represents the ground location. This reconstruction process is essential for maintaining the integrity of the image data while enabling optimal compression. For instance, in a CAT scan of the heart, the image reconstructor 1440 would ensure that the resliced images are properly aligned and oriented to capture the full cardiac cycle without any gaps or discontinuities.

The reconstructed image series is then passed through an encoder 110, which applies lossy compression techniques, such as JPEG or HEVC, to reduce the data size. This step results in a compressed image 1460 but may introduce some loss of information. For example, in a CAT scan, the encoder 110 might use a high-quality JPEG setting to compress each slice individually, achieving a high compression ratio while preserving most of the important anatomical details. In aerial photography, the encoder 110 could use a state-of-the-art video codec like HEVC to compress the reconstructed image series as a video sequence, exploiting both spatial and temporal redundancies to achieve high compression efficiency.

To recover the lost information, the compressed image 1460 may be processed by a decoder 120, which decompresses the data using the appropriate decompression algorithm. For instance, in a CAT scan, the decoder 120 may use a JPEG decoder to reconstruct each compressed slice back to its original resolution and bit depth. In aerial photography, the decoder 120 may use an HEVC decoder to reconstruct the compressed video sequence back into a series of high-quality images. The decompressed image series is then fed into a multi-channel transformer 300.

The multi-channel transformer, which is a type of correlation network 300, is a trained deep learning model that learns correlations between the original image series and the compressed image series. It employs techniques such as convolutional layers for feature extraction and a channel-wise transformer with attention mechanism to capture inter-channel dependencies. For example, correlation network 300 might use skip connections to propagate high-resolution features from the encoder to the decoder, enabling accurate reconstruction of fine details. The channel-wise transformer would allow the model to weigh the importance of different image channels (e.g., color channels in aerial photography or tissue types in CAT scans) and adapt the upsampling process accordingly. By leveraging these learned correlations, correlation network 300 can effectively upsample the compressed image series and recover lost information. For instance, in a CAT scan of the abdomen, correlation network 300 could recover subtle details of the liver and kidneys that were lost during compression, resulting in a higher-quality reconstructed image series.

Figure 15:
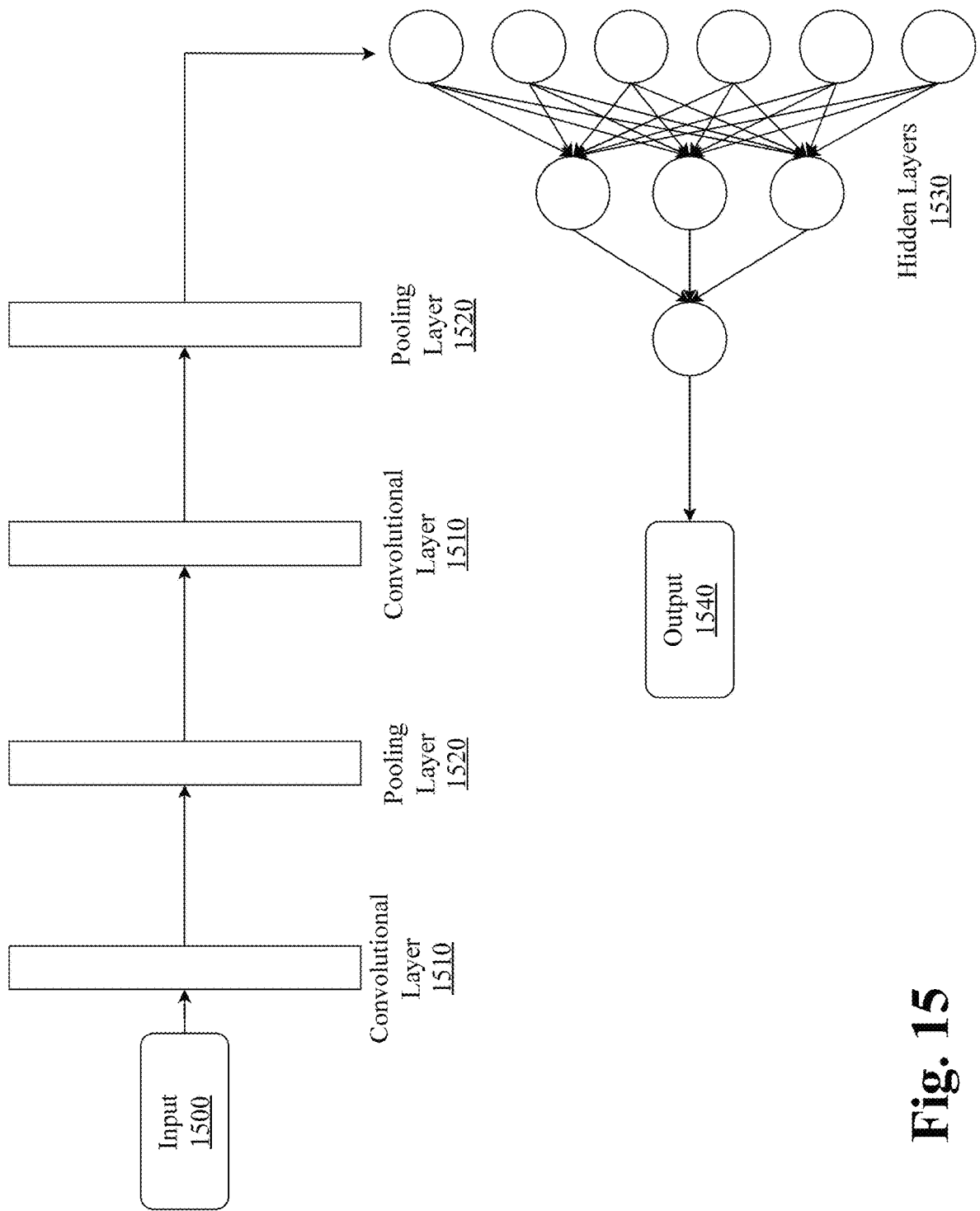
FIG. 15 is a block diagram illustrating a component of a system for image series transformation for optimal compressibility with neural upsampling, an angle optimizer, where the angle optimizer uses a convolutional neural network.

FIG. 15 is a block diagram illustrating a component of a system for image series transformation for optimal compressibility with neural upsampling, an angle optimizer, where the angle optimizer uses a convolutional neural network. An input layer 1500 receives the preprocessed image which needs to be sliced to improved compression.

The input image is then passed through a series of convolutional layers 1510. Each convolutional layer applies a set of learnable filters to the input, performing convolution operations to capture local patterns and spatial dependencies. These filters slide across the input data, computing element-wise multiplications and generating feature maps that highlight relevant patterns and features. The convolutional layers are designed to automatically learn and extract hierarchical representations of the input data, enabling the CNN to identify complex relationships and dependencies within the energy consumption patterns.

After each convolutional layer, a pooling layer 1520 may be applied to downsample the feature maps. Pooling layers reduce the spatial dimensions of the feature maps while retaining the most significant features. Common pooling operations include max pooling and average pooling, which select the maximum or average value within a specified window size. Pooling helps to reduce the computational complexity, control overfitting, and provide translation invariance to the learned features.

The CNN architecture may include multiple convolutional and pooling layers stacked together, allowing for the extraction of increasingly abstract and high-level features as the data progresses through the network. The number and size of the convolutional and pooling layers can be adjusted based on the complexity and characteristics of the input images.

After the convolutional and pooling layers, the extracted features may be flattened and passed through one or more hidden layers 1530. These hidden layers are fully connected, meaning that each neuron in a hidden layer is connected to all the neurons in the previous layer. The hidden layers enable the CNN to learn non-linear combinations of the extracted features and capture complex patterns and relationships within the data. An output layer 1540 produces the optimized angle predictions or recommendations based on the learned features. The output layer can have different configurations depending on the specific task, such as regression for predicting optimal slicing angles or classification for categorizing kinds of input images.

During the training process, the CNN learns the optimal values for the convolutional filters, pooling parameters, and fully connected weights by minimizing a defined loss function. The loss function measures the discrepancy between the predicted outputs and the actual energy consumption values or desired optimization targets. The CNN iteratively adjusts its parameters using optimization algorithms such as gradient descent and backpropagation to minimize the loss and improve its performance.

Once trained, the CNN-based angle optimizer 1420 can take new, unseen images and generate optimized predictions or recommendations for how to optimally slice the images to improve compression. The learned filters and weights enable the CNN to effectively capture and analyze the complex patterns and dependencies within the images, providing accurate and personalized insights for compression on any plurality of image inputs.

Figure 16:
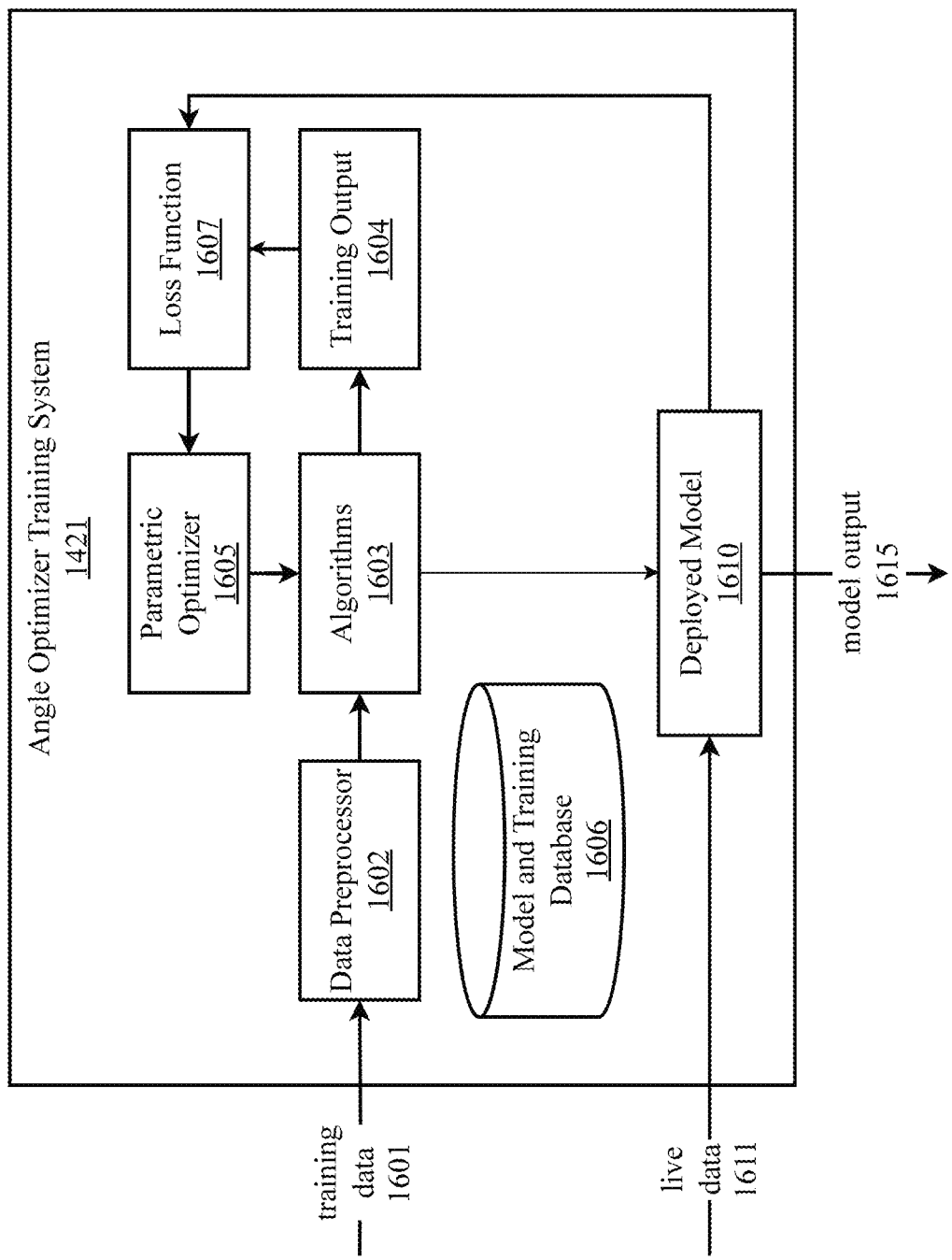
FIG. 16 is a block diagram illustrating a component of a system for image series transformation for optimal compressibility with neural upsampling, an angle optimizer training system.

FIG. 16 is a block diagram illustrating a component of a system for image series transformation for optimal compressibility with neural upsampling, an angle optimizer training system. According to the embodiment, the angle optimizer training system 1421 may comprise a model training stage comprising a data preprocessor 1602, one or more machine and/or deep learning algorithms 1603, training output 1604, and a parametric optimizer 1605, and a model deployment stage comprising a deployed and fully trained model 1610 configured to perform tasks described herein such determining correlations between compressed data sets. The angle optimizer training system 1421 may be used to train and deploy a angle optimizer in order to support the services provided by system for image series transformation for optimal compressibility with neural upsampling.

At the model training stage, a plurality of training data 1601 may be received by the energy angle training system 1421. Data preprocessor 1602 may receive the input data (e.g., a plurality of images) and perform various data preprocessing tasks on the input data to format the data for further processing. For example, data preprocessing can include, but is not limited to, tasks related to data cleansing, data deduplication, data normalization, data transformation, handling missing values, feature extraction and selection, mismatch handling, and/or the like. Data preprocessor 1602 may also be configured to create training dataset, a validation dataset, and a test set from the plurality of input data 1601. For example, a training dataset may comprise 80% of the preprocessed input data, the validation set 10%, and the test dataset may comprise the remaining 10% of the data. The preprocessed training dataset may be fed as input into one or more machine and/or deep learning algorithms 1603 to train a predictive model for object monitoring and detection.

During model training, training output 1604 is produced and used to measure the accuracy and usefulness of the predictive outputs. During this process a parametric optimizer 1605 may be used to perform algorithmic tuning between model training iterations. Model parameters and hyperparameters can include, but are not limited to, bias, train-test split ratio, learning rate in optimization algorithms (e.g., gradient descent), choice of optimization algorithm (e.g., gradient descent, stochastic gradient descent, of Adam optimizer, etc.), choice of activation function in a neural network layer (e.g., Sigmoid, ReLu, Tanh, etc.), the choice of cost or loss function the model will use, number of hidden layers in a neural network, number of activation unites in each layer, the drop-out rate in a neural network, number of iterations (epochs) in a training the model, number of clusters in a clustering task, kernel or filter size in convolutional layers, pooling size, batch size, the coefficients (or weights) of linear or logistic regression models, cluster centroids, and/or the like. Parameters and hyperparameters may be tuned and then applied to the next round of model training. In this way, the training stage provides a machine learning training loop.

In some implementations, various accuracy metrics may be used by the angle optimizer training system 1421 to evaluate a model's performance. Metrics can include, but are not limited to, word error rate (WER), word information loss, speaker identification accuracy (e.g., single stream with multiple speakers), inverse text normalization and normalization error rate, punctuation accuracy, timestamp accuracy, latency, resource consumption, custom vocabulary, sentence-level sentiment analysis, multiple languages supported, cost-to-performance tradeoff, and personal identifying information/payment card industry redaction, to name a few. In one embodiment, the system may utilize a loss function 1607 to measure the system's performance. The loss function 1607 compares the training outputs with an expected output and determined how the algorithm needs to be changed in order to improve the quality of the model output. During the training stage, all outputs may be passed through the loss function 1607 on a continuous loop until the algorithms 1603 are in a position where they can effectively be incorporated into a deployed model 1615.

The test dataset can be used to test the accuracy of the model outputs. If the training model is establishing correlations that satisfy a certain criterion such as but not limited to quality of the correlations and amount of restored lost data, then it can be moved to the model deployment stage as a fully trained and deployed model 1610 in a production environment making predictions based on live input data 1611 (e.g., a plurality of images). Further, model correlations and restorations made by deployed model can be used as feedback and applied to model training in the training stage, wherein the model is continuously learning over time using both training data and live data and predictions. A model and training database 1606 is present and configured to store training/test datasets and developed models. Database 1606 may also store previous versions of models.

According to some embodiments, the one or more machine and/or deep learning models may comprise any suitable algorithm known to those with skill in the art including, but not limited to: LLMs, generative transformers, transformers, supervised learning algorithms such as: regression (e.g., linear, polynomial, logistic, etc.), decision tree, random forest, k-nearest neighbor, support vector machines, Naïve-Bayes algorithm; unsupervised learning algorithms such as clustering algorithms, hidden Markov models, singular value decomposition, and/or the like. Alternatively, or additionally, algorithms 1603 may comprise a deep learning algorithm such as neural networks (e.g., recurrent, convolutional, long short-term memory networks, etc.).

In some implementations, the angle optimizer training system 1421 automatically generates standardized model scorecards for each model produced to provide rapid insights into the model and training data, maintain model provenance, and track performance over time. These model scorecards provide insights into model framework(s) used, training data, training data specifications such as chip size, stride, data splits, baseline hyperparameters, and other factors. Model scorecards may be stored in database(s) 1606.

Figure 17:
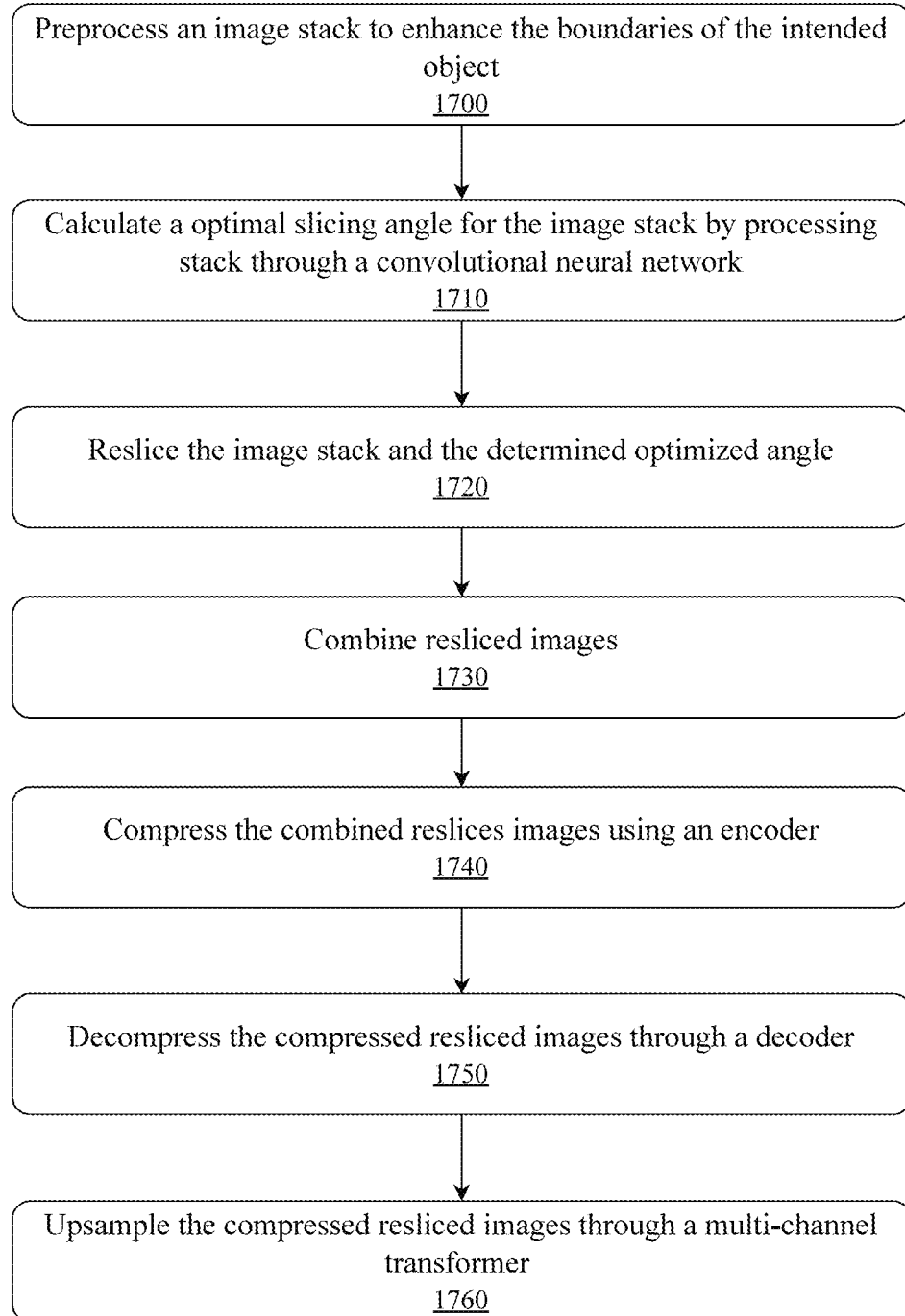
FIG. 17 is a flow diagram illustrating an exemplary method for optimizing the compression and decompression of medical images by slicing the images along various planes before compression.

FIG. 17 is a flow diagram illustrating an exemplary method for optimizing the compression and decompression of medical images by slicing the images along various planes before compression. The method leverages advanced image processing, machine learning, and compression techniques to achieve high compression ratios while preserving critical anatomical details.

In a first step 1700, an input image stack undergoes preprocessing to enhance the boundaries of the intended object, such as an organ of interest. This step may involve techniques like edge detection, contrast enhancement, or noise reduction to accentuate the relevant structures and suppress background noise. For example, in a CT scan of the liver, preprocessing may include applying a Sobel filter to highlight the edges of the liver parenchyma and blood vessels while attenuating any imaging artifacts or surrounding tissues.

In a step 1710, determine the optimal slicing angle for the image stack by processing it through a convolutional neural network (CNN). The CNN is trained to predict the most compressible orientation based on the inherent structure and correlations in the data. It learns to extract relevant features, such as edges, textures, and patterns that are indicative of the underlying anatomy and its alignment. For instance, in an MRI scan of the heart, the CNN may identify the long axis of the left ventricle as the optimal reslicing angle, as it captures the most coherent and compressible representation of the cardiac geometry. In one embodiment, the image stack may be processed using a series of functions which, for each x position along the axis of motion: extracts the 2D slice at the current x position, applies edge detection to identify the organ boundaries of the slice, computes the gradient direction at each boundary point, determines the average gradient direction, which represents the perpendicular direction to the organ boundary at the current x position, and calculates the corresponding slicing angle based on the average gradient direction. An example of a series of functions using Mathematica that achieve this goal may be found in APPENDIX A.

Once the optimal slicing angle is determined, the image stack is resliced along that orientation in step a 1720. This involves resampling the data onto a new grid that is rotated or oblique relative to the original acquisition plane. The reslicing process may use interpolation techniques, such as trilinear or spline interpolation, to estimate the intensity values at the new voxel locations. For example, in a CT scan of the lungs, reslicing along a plane that follows the natural curvature of the bronchial tree could result in a more compact and efficient representation of the pulmonary structure.

In a step 1730, the resliced images are combined into a single volume or series. This step ensures that the resliced data is properly aligned and formatted for subsequent compression and processing. The combining process may involve concatenating the resliced images along a new axis, adjusting their spatial coordinates, or applying any necessary transformations to maintain the integrity of the data. For instance, in an MRI scan of the brain, the combined resliced images may form a new volume that is oriented along the anterior-posterior axis, with consistent voxel dimensions and spacing.

In a step 1740, the combined resliced images are compressed using an encoder, such as a video codec like H.265 or a specialized medical image compression algorithm. The encoder exploits the redundancy and correlations in the resliced data to achieve high compression ratios while minimizing perceptual distortion. It may use techniques like motion estimation, transform coding, and entropy coding to efficiently represent the resliced images in a compact bitstream. For example, in a CT scan of the abdomen, the encoder could use a wavelet-based compression scheme that adapts to the local texture and edge characteristics of the resliced data, resulting in a significantly reduced file size.

The compressed bitstream is then passed through a decoder in a step 1750 to reconstruct the resliced images. The decoder applies the inverse operations of the encoder to recover the resliced data from the compressed representation. This may involve techniques like motion compensation, inverse transforms, and entropy decoding to reconstruct the resliced images with minimal loss of quality. For instance, in an MRI scan of the knee, the decoder could use a deep learning-based approach to restore fine details and textures that may have been lost during compression, resulting in a more accurate and visually pleasing reconstruction.

Finally, in step 1760, the reconstructed resliced images are upsampled using a multi-channel transformer architecture as a correlation network. The correlation network learns to map the low-resolution resliced images to their high-resolution counterparts by exploiting the multi-scale dependencies and contextual information in the data. In one embodiment, it may utilize self-attention mechanisms to capture long-range relationships and generate realistic high-frequency details. For example, in a CT scan of the pancreas, the correlation network could upsample the resliced images, recovering fine structures like pancreatic ducts and blood vessels that may be critical for diagnostic interpretation.

The output of the method is a high-quality, high-resolution reconstruction of the original image stack, but with a significantly reduced file size due to the optimal reslicing and compression steps. This enables more efficient storage, transmission, and visualization of large medical image datasets, such as whole-body CT scans or time-series MRI acquisitions.

Figure 18:
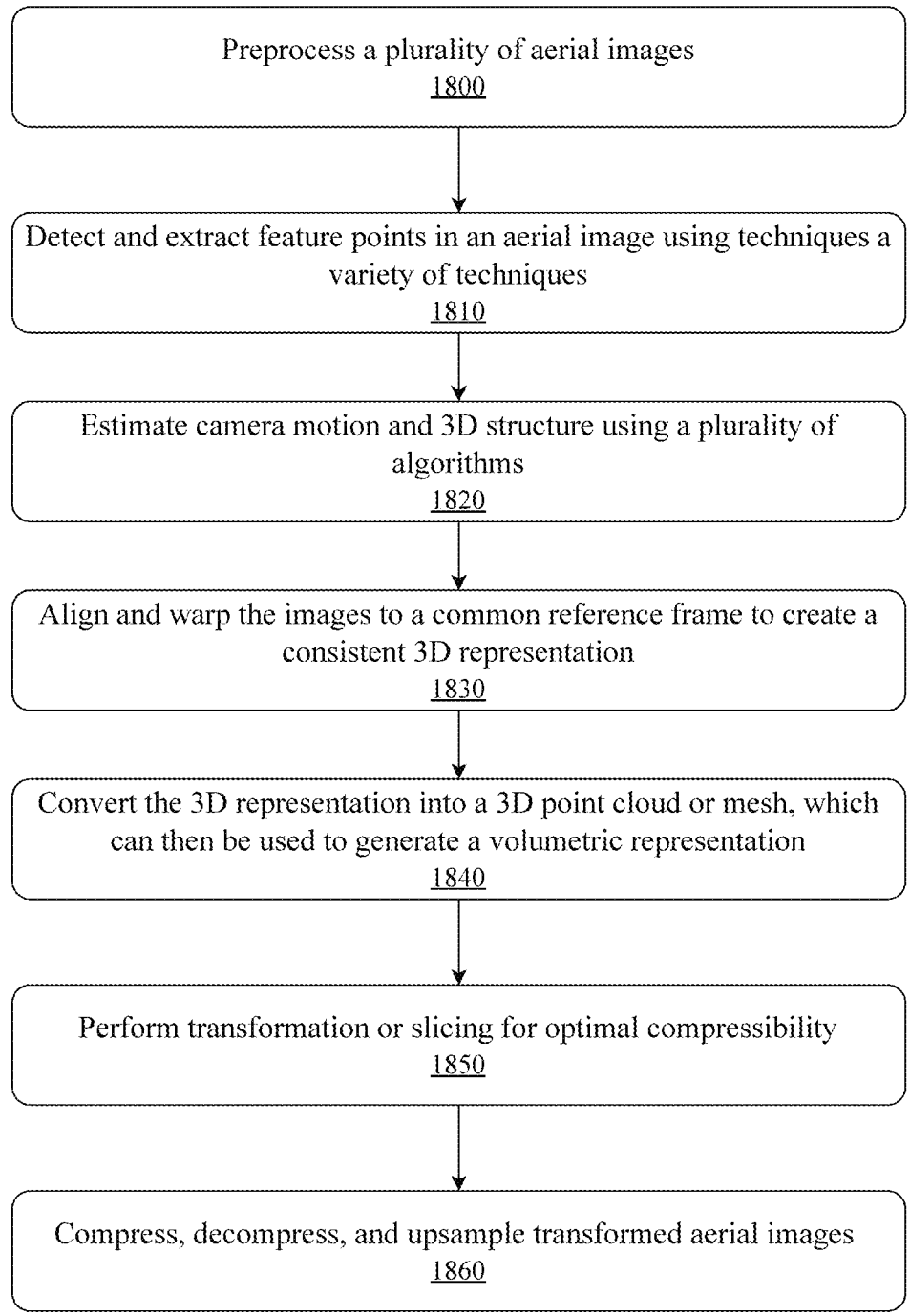
FIG. 18 is a flow diagram illustrating an exemplary method for optimizing the compression and decompression of aerial images by slicing the images along various planes before compression.

FIG. 18 is a flow diagram illustrating an exemplary method for optimizing the compression and decompression of aerial images by slicing the images along various planes before compression. In a first step 1800, a plurality of aerial images undergo preprocessing to enhance their quality and prepare them for subsequent analysis. This may include techniques like lens distortion correction, color balancing, or noise reduction to ensure consistent and accurate representation of the captured scene. For example, in a drone survey of a construction site, preprocessing may involve applying a radiometric calibration to account for variations in lighting and camera exposure across different images.

In a step 1810, detects and extracts feature points in the preprocessed aerial images using a variety of techniques. These features represent distinctive and stable points in the images that can be reliably matched across different views or scales. Common feature detection algorithms include SIFT (Scale-Invariant Feature Transform), SURF (Speeded Up Robust Features), or ORB (Oriented FAST and Rotated BRIEF). For instance, in a satellite image of an urban area, the method may extract corner points of buildings, road intersections, or other salient structures that are visible across multiple images.

Using the extracted feature points, a step 1820 estimates the camera motion and 3D structure of the scene using a plurality of algorithms. This process, known as Structure from Motion (SfM), involves solving for the camera positions, orientations, and intrinsic parameters that best explain the observed feature matches. Common SfM techniques include bundle adjustment, factorization, or incremental reconstruction. For example, in a drone survey of a natural landscape, SfM may recover the 3D coordinates of terrain features like rocks, trees, or rivers, as well as the trajectory of the drone camera.

Once the camera motion and 3D structure are estimated, a step 1830 aligns and warps the aerial images to a common reference frame, creating a consistent 3D representation of the scene. This involves applying geometric transformations to the images, such as rotation, translation, or scaling, to bring them into a unified coordinate system. The alignment process may also involve techniques like image stitching, mosaicking, or blending to create seamless transitions between overlapping views. For instance, in a satellite image of a coastal region, the method may warp and blend multiple images to create a large-scale, georeferenced image that covers the entire area of interest.

In a step 1840, the aligned 3D representation is converted into a 3D point cloud or mesh, which serves as the basis for generating a volumetric representation of the scene. A point cloud is a set of 3D points that represents the surface geometry of the scene, while a mesh is a more compact and structured representation that connects the points into a network of triangles or other polygonal primitives. The conversion process may involve techniques like Poisson surface reconstruction, Delaunay triangulation, or octree partitioning to create a coherent and efficient 3D model. For example, in a drone survey of an archaeological site, the method may generate a dense point cloud of the excavated structures and artifacts, which can be further processed into a textured 3D mesh for visualization and analysis.

With the volumetric representation obtained, a step 1850 performs transformations or slicing operations to achieve optimal compressibility of the aerial image stack. This may involve techniques like octree compression, wavelet transforms, or adaptive reslicing along dominant planes or axes in the 3D model. The goal is to exploit the inherent redundancy and correlations in the volumetric data to achieve high compression ratios while preserving essential features and details. For instance, in a satellite image of a forested region, the method may adaptively slice the 3D model along the terrain surface, aligning the compression scheme with the natural geometry of the trees and minimizing the impact of occlusions or shadows.

In a step 1860, compress, decompress, and upsample the transformed aerial image stack using state-of-the-art codec and deep learning techniques. The compression step may utilize video codecs like H.265 or VP9, which can efficiently encode the sliced volumetric data as a sequence of frames. The decompression step reconstructs the original data from the compressed bitstream, while the upsampling step enhances the resolution and quality of the reconstructed images using deep learning models like convolutional neural networks (CNNs) or generative adversarial networks (GANs). For example, in a drone survey of a agricultural field, the method may compress the sliced 3D model of the crop canopy, reconstruct it at a lower resolution, and then upsample it using a CNN that is trained to recover fine details of leaves, stems, and fruits.

The output of the method is a highly compressed and accurately reconstructed aerial image stack that retains the essential information and visual quality of the original data. This enables more efficient storage, transmission, and analysis of large-scale aerial datasets, such as those used in mapping, monitoring, or inspection applications.

Figure 19:
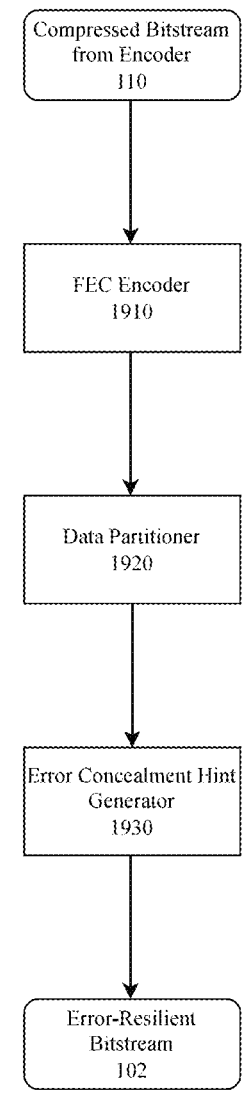
FIG. 19 is a block diagram illustrating exemplary architecture for error resilience subsystem.

FIG. 19 is a block diagram illustrating exemplary architecture for the error resilience subsystem 1900, which is designed to enhance the robustness of compressed SAR image data against transmission errors and data loss. The subsystem comprises several key components that work together to apply various error resilience techniques to the compressed bitstream.

The input to the error resilience subsystem 1900 is the compressed bitstream from the encoder subsystem 110. This compressed data first enters a forward error correction (FEC) encoder 1910. The FEC encoder 1910 applies error correction coding to the compressed data, adding redundant information that can be used to detect and correct errors during transmission. In this embodiment, the FEC encoder 1910 can use either Reed-Solomon codes or Low-Density Parity-Check (LDPC) codes, depending on the specific requirements of the application.

Following the FEC encoder, the data flows into a data partitioner 1920. The data partitioner 1920 separates the compressed image data into multiple partitions based on their importance to image reconstruction. Typically, it creates at least three partitions: header information, low-frequency coefficients, and high-frequency coefficients. This partitioning allows for prioritized protection and transmission of the most critical image data.

Next, an error concealment hint generator 1930 analyzes the partitioned data and generates hints that can be used to conceal errors during the decoding process. These hints may include information about neighboring blocks or redundant feature data. The generator embeds these hints within the compressed data stream in a way that minimizes overhead while maximizing their utility during error concealment.

The partitioned and hint-embedded data then passes through a bitstream assembler 1940. This component reassembles the various partitions and integrates the error concealment hints into a cohesive bitstream structure that can be efficiently transmitted and later decoded.

Finally, an optional interleaver 1950 may be employed to spread burst errors across different parts of the bitstream. This helps to distribute any potential error bursts, making them easier to correct or conceal during the decoding process.

The output of the error resilience subsystem 1900 is an error-resilient bitstream that incorporates forward error correction, data partitioning, and error concealment hints. This enhanced bitstream is then ready for transmission or storage, with improved capability to withstand errors and data loss during these processes.

The error resilience subsystem 1900 is designed to be flexible and adaptable. The specific parameters of each component, such as the FEC code rate, partitioning scheme, and hint generation algorithm, can be adjusted based on the characteristics of the input data and the expected transmission conditions. This adaptability ensures that the system can provide optimal error resilience for a wide range of SAR imaging applications and transmission scenarios.

The error resilience techniques can be adapted for different types of image data. For medical imagery, such as CT or MRI scans, the data partitioning may prioritize diagnostically critical regions, identified through AI-assisted segmentation. For example, in brain scans, areas showing potential tumors or lesions would receive the highest protection. In aerial imagery, the partitioning might prioritize areas of high detail or known points of interest, such as urban centers or specific geological features. The error concealment hints for medical images might leverage inter-slice correlations, while for aerial imagery, they could exploit the continuity of geographical features across adjacent images.

The error resilience subsystem can be optimized for various transmission conditions. In high-noise environments, such as satellite communications in adverse weather, the system might increase the redundancy in forward error correction coding, potentially using more robust LDPC codes with lower code rates. For transmissions over networks with frequent but short interruptions, the interleaving depth could be increased to spread burst errors over a larger data range. In bandwidth-constrained scenarios, the system might employ more aggressive data partitioning, allocating a higher percentage of the bitstream to critical image components while more heavily compressing less important regions. For real-time applications with strict latency requirements, the system could use shorter block lengths in the error correction coding to reduce encoding and decoding delays, potentially at the cost of slightly reduced error correction capability.

The error resilience techniques applied by subsystem 1900 are designed to work in synergy with the AI deblocking network 123 during the decoding process. When the decoder subsystem 120 receives the error-resilient bitstream, it first applies the error correction and concealment techniques based on the embedded FEC codes and error concealment hints. The resulting corrected and partially reconstructed image data is then fed into the AI deblocking network 123.

The AI deblocking network 123 is trained to recognize and utilize the error resilience information embedded in the bitstream. The network's input layers are modified to accept not only the decompressed image data but also error flags indicating which regions were affected by transmission errors and subsequently corrected or concealed. The convolutional layers of the network are trained to identify artifacts resulting from both compression and error concealment, allowing for more effective removal of these artifacts. The channel-wise transformer component of the network is augmented to consider the reliability of different image regions based on the applied error resilience techniques. It assigns higher attention weights to regions that were received without errors or were more successfully corrected. Furthermore, the network incorporates an additional loss term during training that penalizes discrepancies between the reconstructed image and the original in areas flagged as affected by transmission errors.

This integrated approach allows the AI deblocking network to not only remove compression artifacts but also to refine and improve upon the initial error concealment performed by the decoder. The result is a more robust reconstruction process that leverages both traditional error resilience techniques and advanced deep learning methods to produce high-quality images even in the presence of significant transmission errors. By combining the strengths of error resilience coding and AI-based image enhancement, the system achieves superior image reconstruction quality and reliability across a wide range of transmission conditions and error scenarios.

In a non-limiting use case example, consider a scenario where SAR image data is being transmitted from a satellite to a ground station over a noisy communication channel. The error resilience subsystem 1900 can be configured as follows:

The FEC encoder 1910 applies a Reed-Solomon code with a code rate of 0.9, adding 10% overhead for error correction. This choice balances error correction capability with transmission efficiency. The data partitioner 1920 divides the compressed image data into three partitions:

header information (5% of the data), low-frequency coefficients (35% of the data), and high-frequency coefficients (60% of the data). This partitioning ensures that the most critical information (header and low-frequency coefficients) receives stronger protection.

The error concealment hint generator 1930 creates hints based on the correlation between neighboring 8×8 pixel blocks. These hints are embedded within the high-frequency coefficient partition, utilizing approximately 1% of the total bitstream. The bitstream assembler 1940 then packages these components together, placing the header information and low-frequency coefficients at the beginning of the bitstream for prioritized transmission. Finally, the interleaver 1950 spreads the data over a depth of 1000 bits to combat potential burst errors during transmission.

During decoding, if errors are detected in the high-frequency coefficient partition, the decoder can use the error concealment hints to approximate the missing data based on successfully received neighboring blocks. This approach allows for graceful degradation of image quality in the presence of transmission errors, rather than catastrophic failure. This example demonstrates how the error resilience subsystem 1900 can be tailored to specific transmission conditions and data characteristics, providing robust protection for critical image components while maintaining overall system efficiency.

In another non-limiting use case example, consider a scenario where a series of high-resolution CT (Computed Tomography) scans of a patient's brain are being transmitted from a hospital's imaging center to a remote specialist for urgent consultation. The error resilience subsystem 1900 can be configured as follows: The FEC encoder 1910 employs a Low-Density Parity-Check (LDPC) code with a code rate of 0.8, providing strong error correction capabilities. This higher level of redundancy is chosen due to the critical nature of medical data where error-free transmission is paramount.

The data partitioner 1920 divides the compressed image data into four partitions: header information (5% of the data), diagnostic-quality regions of interest (ROIs) identified by AI (30% of the data), medium-priority regions (35% of the data), and background/low-priority regions (30% of the data). This partitioning ensures that the most critical diagnostic information receives the strongest protection and prioritized transmission. The error concealment hint generator 1930 creates hints based on the 3D structure of the CT scan series, exploiting inter-slice correlations. These hints are embedded within the medium-priority and low-priority partitions, using approximately 2% of the total bitstream.

The bitstream assembler 1940 packages these components together, placing the header information and diagnostic-quality ROIs at the beginning of the bitstream, followed by the medium-priority regions, and finally the background/low-priority regions. The interleaver 1950 is configured with a depth of 2000 bits to provide robust protection against burst errors that might occur during wireless transmission to the remote specialist's device.

During decoding, if any errors are detected in the medium-priority or low-priority regions, the decoder can use the error concealment hints to reconstruct the affected areas based on successfully received neighboring slices and regions. This approach ensures that the most critical diagnostic information is preserved with the highest fidelity, while any errors in less critical regions are concealed effectively.

This example demonstrates how the error resilience subsystem 1900 can be adapted to the specific requirements of medical imaging data transmission, where maintaining the integrity of diagnostically important regions is crucial, while still providing effective error resilience for the entire dataset.

Figure 20:
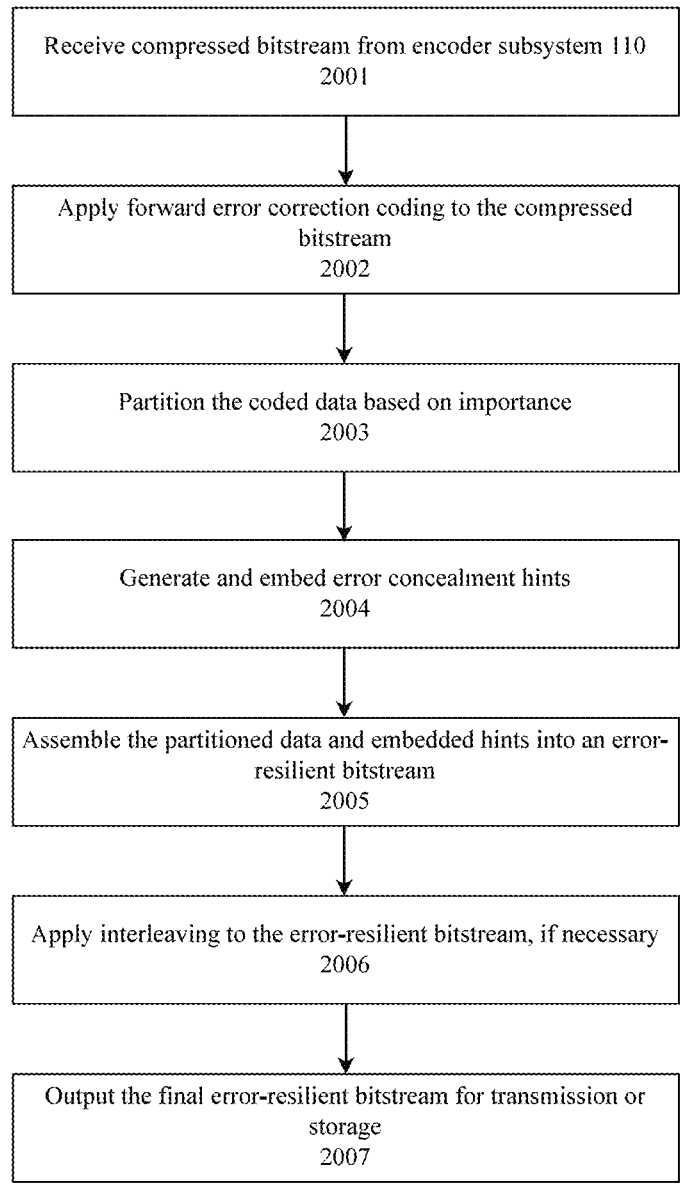
FIG. 20 is a method diagram illustrating the use of error resilience subsystem.

FIG. 20 is a method diagram illustrating the use of error-resilient subsystem 1900. The process begins when the subsystem receives the compressed bitstream from encoder subsystem 110 2001. Next, forward error correction coding is applied to the compressed bitstream, adding redundant information to enable error detection and correction during transmission 2002. The coded data is then partitioned based on importance, separating critical information such as headers and low-frequency coefficients from less crucial data 2003. Following this, the subsystem generates error concealment hints and embeds them within the partitioned data, providing additional information for error recovery during decoding 2004. The partitioned data and embedded hints are then assembled into a cohesive error-resilient bitstream, structuring the data for efficient transmission and decoding 2005. Optionally, interleaving may be applied to the error-resilient bitstream to distribute potential burst errors 2006. Finally, the subsystem outputs the final error-resilient bitstream, which is now prepared for transmission or storage with enhanced protection against data loss and transmission errors 2007.

Exemplary Computing Environment

Figure 21:
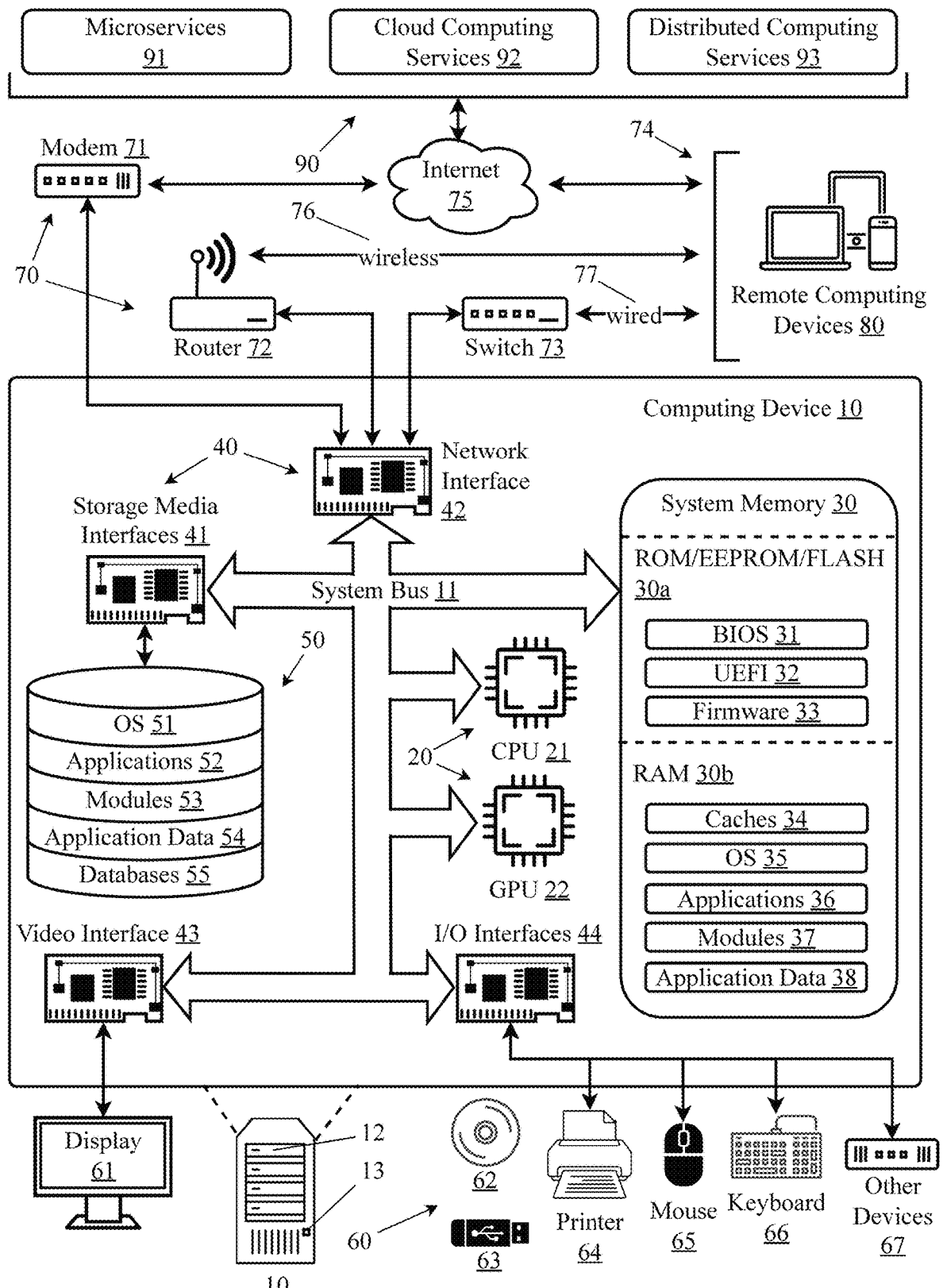
FIG. 21 illustrates an exemplary computing environment on which an embodiment described herein may be implemented, in full or in part.

FIG. 21 illustrates an exemplary computing environment on which an embodiment described herein may be implemented, in full or in part. This exemplary computing environment describes computer-related components and processes supporting enabling disclosure of computer-implemented embodiments. Inclusion in this exemplary computing environment of well-known processes and computer components, if any, is not a suggestion or admission that any embodiment is no more than an aggregation of such processes or components. Rather, implementation of an embodiment using processes and components described in this exemplary computing environment will involve programming or configuration of such processes and components resulting in a machine specially programmed or configured for such implementation. The exemplary computing environment described herein is only one example of such an environment and other configurations of the components and processes are possible, including other relationships between and among components, and/or absence of some processes or components described. Further, the exemplary computing environment described herein is not intended to suggest any limitation as to the scope of use or functionality of any embodiment implemented, in whole or in part, on components or processes described herein.

The exemplary computing environment described herein comprises a computing device 10 (further comprising a system bus 11, one or more processors 20, a system memory 30, one or more interfaces 40, one or more non-volatile data storage devices 50), external peripherals and accessories 60, external communication devices 70, remote computing devices 80, and cloud-based services 90.

System bus 11 couples the various system components, coordinating operation of and data transmission between those various system components. System bus 11 represents one or more of any type or combination of types of wired or wireless bus structures including, but not limited to, memory busses or memory controllers, point-to-point connections, switching fabrics, peripheral busses, accelerated graphics ports, and local busses using any of a variety of bus architectures. By way of example, such architectures include, but are not limited to, Industry Standard Architecture (ISA) busses, Micro Channel Architecture (MCA) busses, Enhanced ISA (EISA) busses, Video Electronics Standards Association (VESA) local busses, a Peripheral Component Interconnects (PCI) busses also known as a Mezzanine busses, or any selection of, or combination of, such busses. Depending on the specific physical implementation, one or more of the processors 20, system memory 30 and other components of the computing device 10 can be physically co-located or integrated into a single physical component, such as on a single chip. In such a case, some or all of system bus 11 can be electrical pathways within a single chip structure.

Computing device may further comprise externally-accessible data input and storage devices 12 such as compact disc read-only memory (CD-ROM) drives, digital versatile discs (DVD), or other optical disc storage for reading and/or writing optical discs 62; magnetic cassettes, magnetic tape, magnetic disk storage, or other magnetic storage devices; or any other medium which can be used to store the desired content and which can be accessed by the computing device 10. Computing device may further comprise externally-accessible data ports or connections 12 such as serial ports, parallel ports, universal serial bus (USB) ports, and infrared ports and/or transmitter/receivers. Computing device may further comprise hardware for wireless communication with external devices such as IEEE 1394 ("Firewire") interfaces, IEEE 802.11 wireless interfaces, BLUETOOTH® wireless interfaces, and so forth. Such ports and interfaces may be used to connect any number of external peripherals and accessories 60 such as visual displays, monitors, and touch-sensitive screens 61, USB solid state memory data storage drives (commonly known as "flash drives" or "thumb drives") 63, printers 64, pointers and manipulators such as mice 65, keyboards 66, and other devices 67 such as joysticks and gaming pads, touchpads, additional displays and monitors, and external hard drives (whether solid state or disc-based), microphones, speakers, cameras, and optical scanners.

Processors 20 are logic circuitry capable of receiving programming instructions and processing (or executing) those instructions to perform computer operations such as retrieving data, storing data, and performing mathematical calculations. Processors 20 are not limited by the materials from which they are formed or the processing mechanisms employed therein, but are typically comprised of semiconductor materials into which many transistors are formed together into logic gates on a chip (i.e., an integrated circuit or IC). The term processor includes any device capable of receiving and processing instructions including, but not limited to, processors operating on the basis of quantum computing, optical computing, mechanical computing (e.g., using nanotechnology entities to transfer data), and so forth. Depending on configuration, computing device 10 may comprise more than one processor. For example, computing device 10 may comprise one or more central processing units (CPUs) 21, each of which itself has multiple processors or multiple processing cores, each capable of independently or semi-independently processing programming instructions based on technologies like CISC or RISC. Further, computing device 10 may comprise one or more specialized processors such as a graphics processing unit (GPU) 22 configured to accelerate processing of computer graphics and images via a large array of specialized processing cores arranged in parallel. The term processor may further include: neural processing units (NPUs) or neural computing units optimized for machine learning and artificial intelligence workloads using specialized architectures and data paths; tensor processing units (TPUs) designed to efficiently perform matrix multiplication and convolution operations used heavily in neural networks and deep learning applications; application-specific integrated circuits (ASICs) implementing custom logic for domain-specific tasks; application-specific instruction set processors (ASIPs) with instruction sets tailored for particular applications; field-programmable gate arrays (FPGAs) providing reconfigurable logic fabric that can be customized for specific processing tasks; processors operating on emerging computing paradigms such as quantum computing, optical computing, mechanical computing (e.g., using nanotechnology entities to transfer data), and so forth. Depending on configuration, computing device 10 may comprise one or more of any of the above types of processors in order to efficiently handle a variety of general purpose and specialized computing tasks. The specific processor configuration may be selected based on performance, power, cost, or other design constraints relevant to the intended application of computing device 10.

System memory 30 is processor-accessible data storage in the form of volatile and/or nonvolatile memory. System memory 30 may be either or both of two types: non-volatile memory and volatile memory. Non-volatile memory 30*a* is not erased when power to the memory is removed, and includes memory types such as read only memory (ROM), electronically-erasable programmable memory (EEPROM), and rewritable solid state memory (commonly known as "flash memory"). Non-volatile memory 30*a* is typically used for long-term storage of a basic input/output system (BIOS) 31, containing the basic instructions, typically loaded during computer startup, for transfer of information between components within computing device, or a unified extensible firmware interface (UEFI), which is a modern replacement for BIOS that supports larger hard drives, faster boot times, more security features, and provides native support for graphics and mouse cursors. Non-volatile memory 30*a* may also be used to store firmware comprising a complete operating system 35 and applications 36 for operating computer-controlled devices. The firmware approach is often used for purpose-specific computer-controlled devices such as appliances and Internet-of-Things (IoT) devices where processing power and data storage space is limited. Volatile memory 30*b* is erased when power to the memory is removed and is typically used for short-term storage of data for processing. Volatile memory 30*b* includes memory types such as random-access memory (RAM), and is normally the primary operating memory into which the operating system 35, applications 36, program modules 37, and application data 38 are loaded for execution by processors 20. Volatile memory 30*b* is generally faster than non-volatile memory 30*a* due to its electrical characteristics and is directly accessible to processors 20 for processing of instructions and data storage and retrieval. Volatile memory 30*b* may comprise one or more smaller cache memories which operate at a higher clock speed and are typically placed on the same IC as the processors to improve performance.

Interfaces 40 may include, but are not limited to, storage media interfaces 41, network interfaces 42, display interfaces 43, and input/output interfaces 44. Storage media interface 41 provides the necessary hardware interface for loading data from non-volatile data storage devices 50 into system memory 30 and storage data from system memory 30 to non-volatile data storage device 50. Network interface 42 provides the necessary hardware interface for computing device 10 to communicate with remote computing devices 80 and cloud-based services 90 via one or more external communication devices 70. Display interface 43 allows for connection of displays 61, monitors, touchscreens, and other visual input/output devices. Display interface 43 may include a graphics card for processing graphics-intensive calculations and for handling demanding display requirements. Typically, a graphics card includes a graphics processing unit (GPU) and video RAM (VRAM) to accelerate display of graphics. One or more input/output (I/O) interfaces 44 provide the necessary support for communications between computing device 10 and any external peripherals and accessories 60. For wireless communications, the necessary radio-frequency hardware and firmware may be connected to I/O interface 44 or may be integrated into I/O interface 44.

Non-volatile data storage devices 50 are typically used for long-term storage of data. Data on non-volatile data storage devices 50 is not erased when power to the non-volatile data storage devices 50 is removed. Non-volatile data storage devices 50 may be implemented using any technology for non-volatile storage of content including, but not limited to, CD-ROM drives, digital versatile discs (DVD), or other optical disc storage; magnetic cassettes, magnetic tape, magnetic disc storage, or other magnetic storage devices; solid state memory technologies such as EEPROM or flash memory; or other memory technology or any other medium which can be used to store data without requiring power to retain the data after it is written. Non-volatile data storage devices 50 may be non-removable from computing device 10 as in the case of internal hard drives, removable from computing device 10 as in the case of external USB hard drives, or a combination thereof, but computing device will typically comprise one or more internal, non-removable hard drives using either magnetic disc or solid state memory technology. Non-volatile data storage devices 50 may store any type of data including, but not limited to, an operating system 51 for providing low-level and mid-level functionality of computing device 10, applications 52 for providing high-level functionality of computing device 10, program modules 53 such as containerized programs or applications, or other modular content or modular programming, application data 54, and databases 55 such as relational databases, non-relational databases, object oriented databases, NoSQL databases, and graph databases.

Applications (also known as computer software or software applications) are sets of programming instructions designed to perform specific tasks or provide specific functionality on a computer or other computing devices. Applications are typically written in high-level programming languages such as C++, Java, Scala, Rust, Go, and Python, which are then either interpreted at runtime or compiled into low-level, binary, processor-executable instructions operable on processors 20. Applications may be containerized so that they can be run on any computer hardware running any known operating system. Containerization of computer software is a method of packaging and deploying applications along with their operating system dependencies into self-contained, isolated units known as containers. Containers provide a lightweight and consistent runtime environment that allows applications to run reliably across different computing environments, such as development, testing, and production systems.

The memories and non-volatile data storage devices described herein do not include communication media. Communication media are means of transmission of information such as modulated electromagnetic waves or modulated data signals configured to transmit, not store, information. By way of example, and not limitation, communication media includes wired communications such as sound signals transmitted to a speaker via a speaker wire, and wireless communications such as acoustic waves, radio frequency (RF) transmissions, infrared emissions, and other wireless media.

External communication devices 70 are devices that facilitate communications between computing device and either remote computing devices 80, or cloud-based services 90, or both. External communication devices 70 include, but are not limited to, data modems 71 which facilitate data transmission between computing device and the Internet 75 via a common carrier such as a telephone company or internet service provider (ISP), routers 72 which facilitate data transmission between computing device and other devices, and switches 73 which provide direct data communications between devices on a network. Here, modem 71 is shown connecting computing device 10 to both remote computing devices 80 and cloud-based services 90 via the Internet 75. While modem 71, router 72, and switch 73 are shown here as being connected to network interface 42, many different network configurations using external communication devices 70 are possible. Using external communication devices 70, networks may be configured as local area networks (LANs) for a single location, building, or campus, wide area networks (WANs) comprising data networks that extend over a larger geographical area, and virtual private networks (VPNs) which can be of any size but connect computers via encrypted communications over public networks such as the Internet 75. As just one exemplary network configuration, network interface 42 may be connected to switch 73 which is connected to router 72 which is connected to modem 71 which provides access for computing device 10 to the Internet 75. Further, any combination of wired 77 or wireless 76 communications between and among computing device 10, external communication devices 70, remote computing devices 80, and cloud-based services 90 may be used. Remote computing devices 80, for example, may communicate with computing device through a variety of communication channels 74 such as through switch 73 via a wired 77 connection, through router 72 via a wireless connection 76, or through modem 71 via the Internet 75. Furthermore, while not shown here, other hardware that is specifically designed for servers may be employed. For example, secure socket layer (SSL) acceleration cards can be used to offload SSL encryption computations, and transmission control protocol/internet protocol (TCP/IP) offload hardware and/or packet classifiers on network interfaces 42 may be installed and used at server devices.

In a networked environment, certain components of computing device 10 may be fully or partially implemented on remote computing devices 80 or cloud-based services 90. Data stored in non-volatile data storage device 50 may be received from, shared with, duplicated on, or offloaded to a non-volatile data storage device on one or more remote computing devices 80 or in a cloud computing service 92. Processing by processors 20 may be received from, shared with, duplicated on, or offloaded to processors of one or more remote computing devices 80 or in a distributed computing service 93. By way of example, data may reside on a cloud computing service 92, but may be usable or otherwise accessible for use by computing device 10. Also, certain processing subtasks may be sent to a microservice 91 for processing with the result being transmitted to computing device 10 for incorporation into a larger processing task. Also, while components and processes of the exemplary computing environment are illustrated herein as discrete units (e.g., OS 51 being stored on non-volatile data storage device 51 and loaded into system memory 35 for use) such processes and components may reside or be processed at various times in different components of computing device 10, remote computing devices 80, and/or cloud-based services 90.

In an implementation, the disclosed systems and methods may utilize, at least in part, containerization techniques to execute one or more processes and/or steps disclosed herein. Containerization is a lightweight and efficient virtualization technique that allows you to package and run applications and their dependencies in isolated environments called containers. One of the most popular containerization platforms is Docker, which is widely used in software development and deployment. Containerization, particularly with open-source technologies like Docker and container orchestration systems like Kubernetes, is a common approach for deploying and managing applications. Containers are created from images, which are lightweight, standalone, and executable packages that include application code, libraries, dependencies, and runtime. Images are often built from a Dockerfile or similar, which contains instructions for assembling the image. Dockerfiles are configuration files that specify how to build a Docker image. Systems like Kubernetes also support containerd or CRI-O. They include commands for installing dependencies, copying files, setting environment variables, and defining runtime configurations. Docker images are stored in repositories, which can be public or private. Docker Hub is an exemplary public registry, and organizations often set up private registries for security and version control using tools such as Hub, JFrog Artifactory and Bintray, Github Packages or Container registries. Containers can communicate with each other and the external world through networking. Docker provides a bridge network by default, but can be used with custom networks. Containers within the same network can communicate using container names or IP addresses.

Remote computing devices 80 are any computing devices not part of computing device 10. Remote computing devices 80 include, but are not limited to, personal computers, server computers, thin clients, thick clients, personal digital assistants (PDAs), mobile telephones, watches, tablet computers, laptop computers, multiprocessor systems, microprocessor based systems, set-top boxes, programmable consumer electronics, video game machines, game consoles, portable or handheld gaming units, network terminals, desktop personal computers (PCs), minicomputers, mainframe computers, network nodes, virtual reality or augmented reality devices and wearables, and distributed or multi-processing computing environments. While remote computing devices 80 are shown for clarity as being separate from cloud-based services 90, cloud-based services 90 are implemented on collections of networked remote computing devices 80.

Cloud-based services 90 are Internet-accessible services implemented on collections of networked remote computing devices 80. Cloud-based services are typically accessed via application programming interfaces (APIs) which are software interfaces which provide access to computing services within the cloud-based service via API calls, which are pre-defined protocols for requesting a computing service and receiving the results of that computing service. While cloud-based services may comprise any type of computer processing or storage, three common categories of cloud-based services 90 are serverless logic apps, microservices 91, cloud computing services 92, and distributed computing services 93.

Microservices 91 are collections of small, loosely coupled, and independently deployable computing services. Each microservice represents a specific computing functionality and runs as a separate process or container. Microservices promote the decomposition of complex applications into smaller, manageable services that can be developed, deployed, and scaled independently. These services communicate with each other through well-defined application programming interfaces (APIs), typically using lightweight protocols like HTTP or message queues. Microservices 91 can be combined to perform more complex or distributed processing tasks. In an embodiment, Kubernetes clusters with containerd resources is used for operational packaging of system.

Cloud computing services 92 are delivery of computing resources and services over the Internet 75 from a remote location. Cloud computing services 92 provide additional computer hardware and storage on as-needed or subscription basis. Cloud computing services 92 can provide large amounts of scalable data storage, access to sophisticated software and powerful server-based processing, or entire computing infrastructures and platforms. For example, cloud computing services can provide virtualized computing resources such as virtual machines, storage, and networks, platforms for developing, running, and managing applications without the complexity of infrastructure management, and complete software applications over public or private networks or the Internet on a subscription or alternative licensing basis.

Distributed computing services 93 provide large-scale processing using multiple interconnected computers or nodes to solve computational problems or perform tasks collectively. In distributed computing, the processing and storage capabilities of multiple machines are leveraged to work together as a unified system. Distributed computing services are designed to address problems that cannot be efficiently solved by a single computer or that require large-scale computational power or support for highly dynamic compute, transport or storage resource variance over time requiring scaling up and down of constituent system resources. These services enable parallel processing, fault tolerance, and scalability by distributing tasks across multiple nodes.

Although described above as a physical device, computing device 10 can be a virtual computing device, in which case the functionality of the physical components herein described, such as processors 20, system memory 30, network interfaces 40, NVLink or other GPU-to-GPU high bandwidth communications links and other like components can be provided by computer-executable instructions. Such computer-executable instructions can execute on a single physical computing device, or can be distributed across multiple physical computing devices, including being distributed across multiple physical computing devices in a dynamic manner such that the specific, physical computing devices hosting such computer-executable instructions can dynamically change over time depending upon need and availability. In the situation where computing device 10 is a virtualized device, the underlying physical computing devices hosting such a virtualized computing device can, themselves, comprise physical components analogous to those described above, and operating in a like manner. Furthermore, virtual computing devices can be utilized in multiple layers with one virtual computing device executing within the construct of another virtual computing device. Thus, computing device 10 may be either a physical computing device or a virtualized computing device within which computer-executable instructions can be executed in a manner consistent with their execution by a physical computing device. Similarly, terms referring to physical components of the computing device, as utilized herein, mean either those physical components or virtualizations thereof performing the same or equivalent functions.

The skilled person will be aware of a range of possible modifications of the various aspects described above. Accordingly, the present invention is defined by the claims and their equivalents.

Computer Program Listing Appendix

SAMPLE MATHEMATICA CODE FOR OPTIMALLY SLICING A PLURALITY OF IMAGES WITHOUT A CONVOLUTIONAL NEURAL NETWORK

```
...mathematica
(* Function to preprocess the image stack *)
preprocessImageStack[imageStack_] := Module[{preprocessed},
   preprocessed = GaussianFilter[imageStack, 2]; (* Smoothing *)
   preprocessed = LaplacianGaussianFilter[preprocessed, 2]; (* Edge enhancement *)
   preprocessed
];
(* Function to compute the slicing angle at a given x position *)
computeSlicingAngle[slice_] := Module[{edges, gradients, avgGradient, angle},
   edges = EdgeDetect[slice, Method -> "Sobel"];
   gradients = GradientOrientationFilter[edges, 1];
   avgGradient = Mean[gradients[1, 1]]]; (* Average gradient direction *)
   angle = ArcTan[avgGradient[2]]/avgGradient[1]]]; (* Convert to angle *)
   angle
];
(* Function to reslice the image stack with adaptive angles *)
adaptiveReslice[imageStack_] := Module[{nx, ny, nz, preprocessed, angles, reslicedStack},
   {nx, ny, nz} = Dimensions[imageStack];
   preprocessed = preprocessImageStack[imageStack];
   angles = Table[
      computeSlicingAngle[preprocessed[[x]]],
      {x, 1, nx}
   ];
   reslicedStack = Table[
      resliceImageStack[imageStack, angle],
      { angle, angles }
   ];
   reslicedStack
];
(* Function to combine resliced images, accounting for overlapping voxels *)
combineReslicedImages[reslicedStack_] := Module[{ combined, weights},
   combined = Total[reslicedStack];
   weights = Total[Unitize[reslicedStack], {2}];
   combined = MapThread[Divide, { combined, weights }, 2];
   combined
];
(* Example usage *)
imageStack = (* Load or generate your image stack *);
reslicedStack = adaptiveReslice[imageStack];
finalStack = combineReslicedImages[reslicedStack];
```

What is claimed is:

1. A system for image series transformation for optimal compressibility with neural upsampling and error resilience, comprising:
a computing device comprising at least a memory and a processor;
a plurality of programming instructions that, when operating on the processor, cause the computing device to:
collect a plurality of images;
train an angle optimizer using the plurality of images on how to optimally slice the plurality of images to maximize each image's compressibility;
slice the images along an optimal angle, as determined by the angle optimizer; and
reconstruct the slices images into a plurality of reconstructed images;
encode the plurality of reconstructed images into a plurality of compressed images;
apply error resilience techniques to the compressed images;
decode the plurality of compressed images into a plurality of decompressed images; and
upsample the plurality of compressed images using a correlation network, where the output includes more information than the plurality of reconstructed images.

2. The system of claim 1, wherein the angle optimizer is a convolutional neural network.

3. The system of claim 1, wherein the plurality of images includes medical images such as CAT scans, and aerial images which may be processed into 3D representations.

4. The system of claim 1, wherein applying error resilience techniques comprises:
forward error correction coding;
data partitioning based on importance; and
embedding error concealment hints.

5. The system of claim 4, wherein decoding the plurality of compressed images includes performing error correction and concealment based on the applied error resilience techniques.

6. The system of claim 4, wherein the forward error correction coding uses Reed-Solomon codes or Low-Density Parity-Check codes.

7. The system of claim 4, wherein the data partitioning separates the compressed images into at least three partitions.

8. The system of claim 4, wherein the error concealment hints include information about neighboring blocks or redundant feature data.

9. A method for image series transformation for optimal compressibility with neural upsampling and error resilience, comprising the steps of:
    collecting a plurality of images;
    training an angle optimizer using the plurality of images on how to optimally slice the plurality of images to maximize each image's compressibility;
    slicing the images along an optimal angle, as determined by the angle optimizer;
    reconstructing the sliced images into a plurality of reconstructed images;
    encoding the plurality of reconstructed images into a plurality of compressed images;
    applying error resilience techniques to the compressed images;
    decoding the plurality of compressed images into a plurality of decompressed images;
    upsampling the plurality of decompressed images using a correlation network, where the output includes more information than the plurality of reconstructed images.

10. The method of claim 9, wherein the angle optimizer is a convolutional neural network.

11. The method of claim 9, wherein the plurality of images includes medical images such as CAT scans, and aerial images which may be processed into 3D representations.

12. The method of claim 9, wherein applying error resilience techniques comprises:
    forward error correction coding;
    data partitioning based on importance; and
    embedding error concealment hints.

13. The method of claim 12, wherein decoding the plurality of compressed images includes performing error correction and concealment based on the applied error resilience techniques.

14. The method of claim 12, wherein the forward error correction coding uses Reed-Solomon codes or Low-Density Parity-Check codes.

15. The method of claim 12, wherein the data partitioning separates the compressed images into at least three partitions.

16. The method of claim 12, wherein the error concealment hints include information about neighboring blocks or redundant feature data.

* * * * *